(12) United States Patent  
Wilson et al.

(10) Patent No.: US 8,274,397 B2
(45) Date of Patent: Sep. 25, 2012

(54) PROGRAMMABLE LIGHT DISPLAY

(75) Inventors: Gary Wilson, Reno, NV (US); Raymond G Bryan, Reno, NV (US); Richard L Hicksted, Reno, NV (US)

(73) Assignee: Sonoma Circuits, Inc., Sparks, NV (US)

( * ) Notice: Subject to any disclaimer, the term of this patent is extended or adjusted under 35 U.S.C. 154(b) by 1113 days.

(21) Appl. No.: 11/844,489

(22) Filed: Aug. 24, 2007

(65) Prior Publication Data

US 2009/0051506 A1   Feb. 26, 2009

(51) Int. Cl.
*G08B 5/22* (2006.01)

(52) U.S. Cl. .................. 340/815.45; 340/332; 340/331; 315/312

(58) Field of Classification Search .................. 340/332, 340/331; 315/312
See application file for complete search history.

(56) References Cited

U.S. PATENT DOCUMENTS

| | | | |
|---|---|---|---|
| 3,484,598 A | 12/1969 | Witsch | |
| 3,692,998 A | 9/1972 | Adams | |
| 3,846,672 A * | 11/1974 | Doughty | 315/312 |
| 5,299,102 A | 3/1994 | Zimmerman | |
| 5,420,482 A | 5/1995 | Phares | |
| 5,599,087 A | 2/1997 | Kanno et al. | |
| 5,632,551 A | 5/1997 | Roney et al. | |
| 6,016,038 A | 1/2000 | Mueller et al. | |
| 6,095,663 A | 8/2000 | Pond et al. | |
| 6,150,774 A | 11/2000 | Mueller | |
| 6,340,868 B1 | 1/2002 | Lys et al. | |
| 6,380,865 B1 | 4/2002 | Pederson | |
| 6,459,919 B1 | 10/2002 | Lys et al. | |
| 6,461,008 B1 | 10/2002 | Pederson | |
| 6,462,669 B1 | 10/2002 | Pederson | |
| 6,614,359 B2 | 9/2003 | Pederson | |
| 6,623,151 B2 | 9/2003 | Pederson | |
| 6,693,551 B2 | 2/2004 | Pederson | |
| 6,700,502 B1 | 3/2004 | Pederson | |
| 6,707,389 B2 | 3/2004 | Pederson | |
| 6,789,930 B2 | 9/2004 | Pederson | |
| 6,858,986 B2 | 2/2005 | Monk | |
| 7,352,339 B2 * | 4/2008 | Morgan et al. | 345/31 |
| 2002/0036908 A1 | 3/2002 | Pederson | |
| 2003/0177280 A1 | 9/2003 | Webster et al. | |
| 2004/0032745 A1 | 2/2004 | Pederson | |

OTHER PUBLICATIONS

LIN—Local Interconnect Network; HW-server; http://www.hw-server.com/docs/lin.html; May 22, 2007.

* cited by examiner

*Primary Examiner* — Daryl Pope

(74) *Attorney, Agent, or Firm* — Woodcock Washburn LLP

(57) ABSTRACT

Programmable light assemblies that may function in various operating modes, such as to function as marker lights and/or emergency lights, or have other functions, are disclosed. The protocol and architecture of the light assemblies enables the associated light fixtures to provide a constant current output despite the presence of substantially large voltage ranges, and even when submerged in water. Alternative embodiments of the programmable light assemblies of the invention provide many other features as described herein.

53 Claims, 15 Drawing Sheets

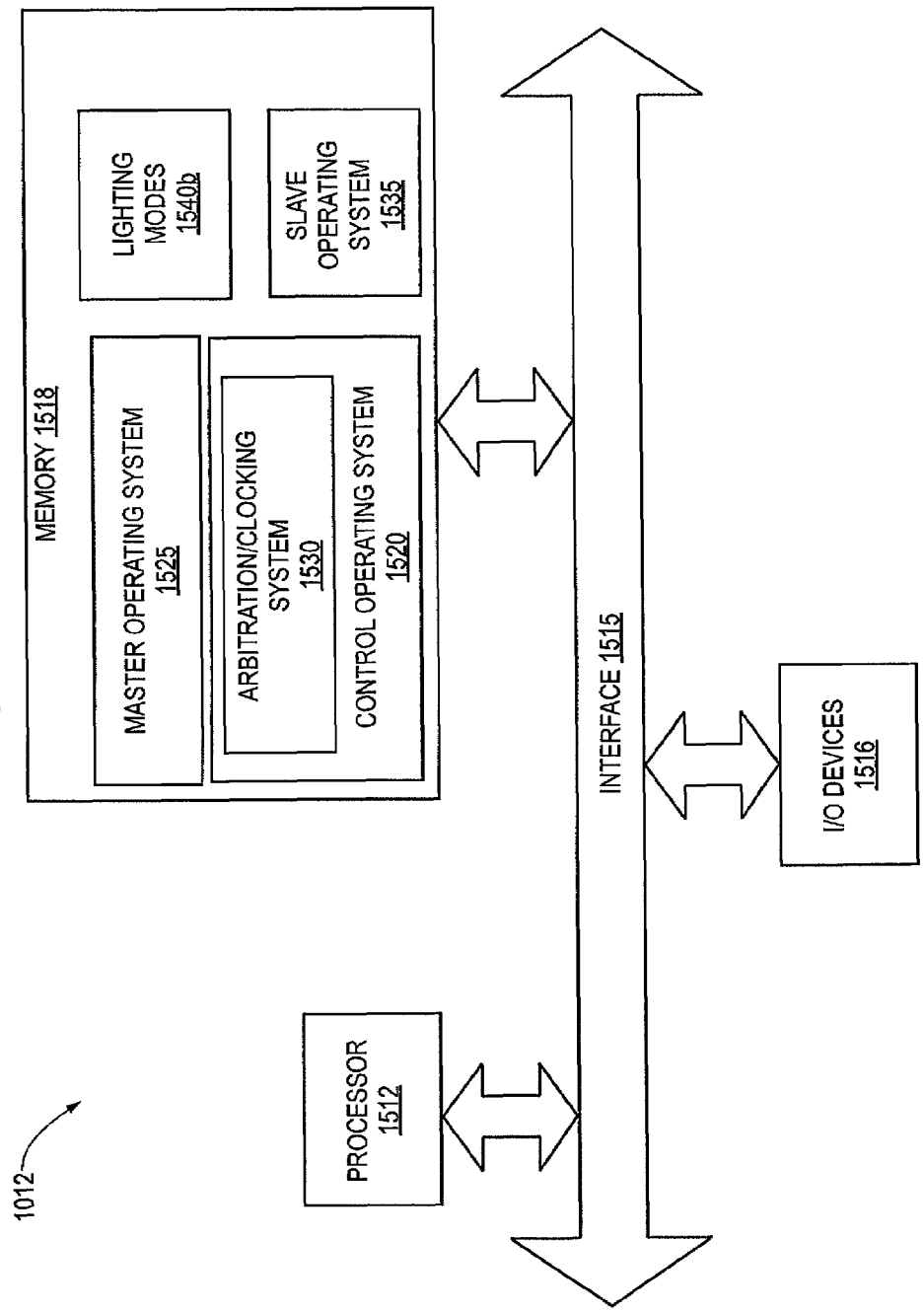

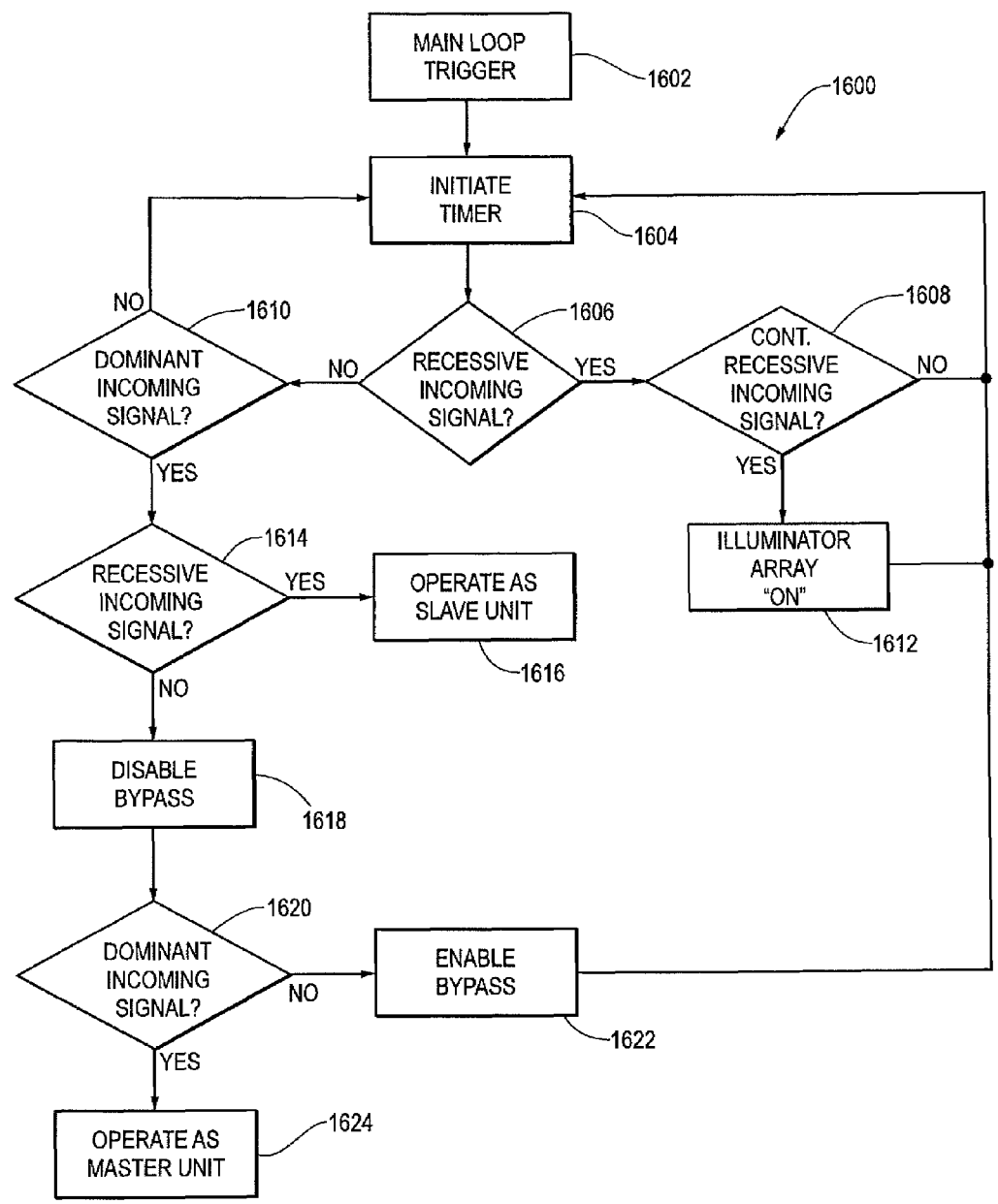

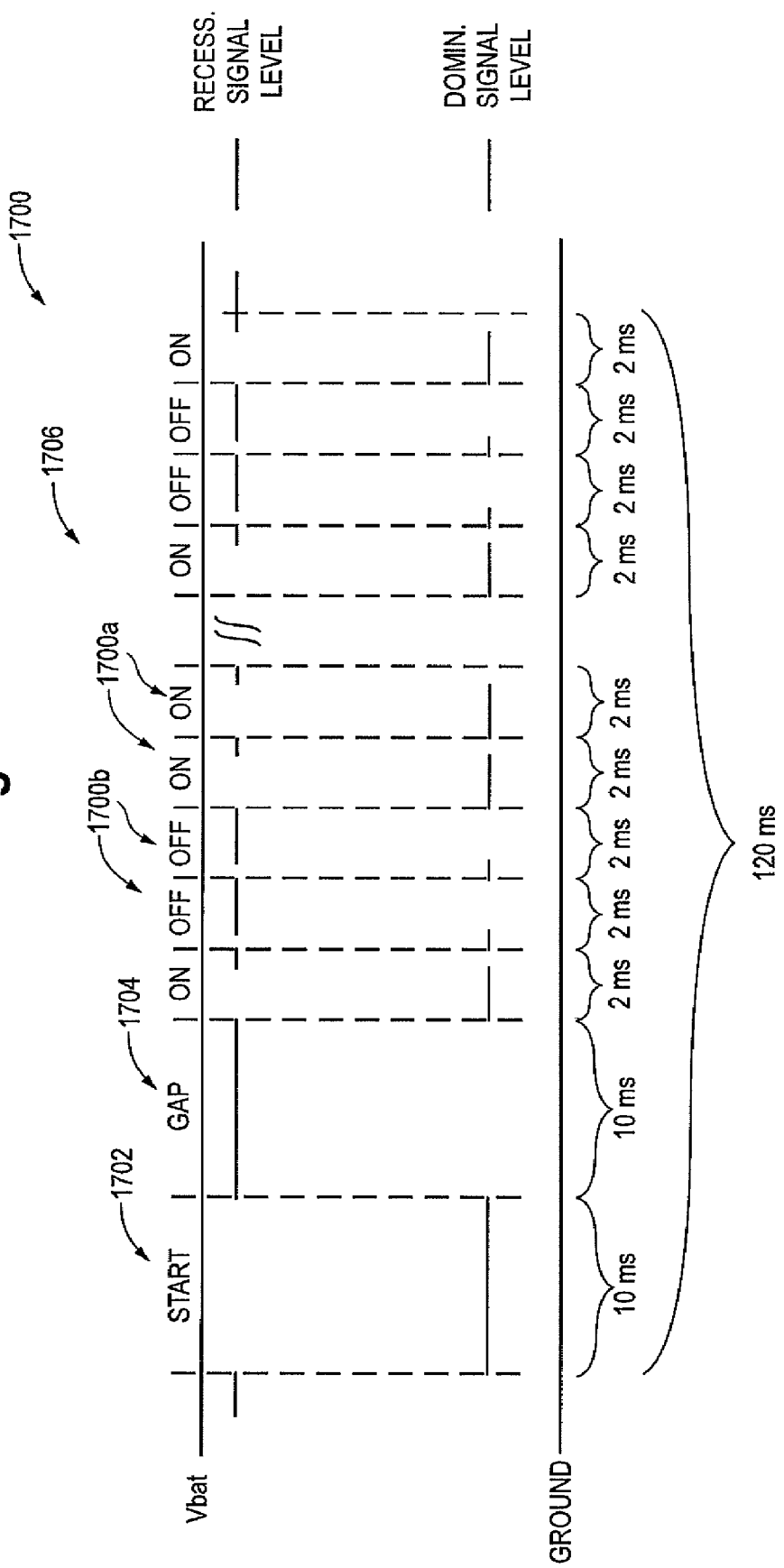

PROGRAMMABLE LIGHT DISPLAY

FIELD OF THE INVENTION

The present invention relates generally to lighting fixtures that may be operated in a coordinated manner. More specifically, the invention relates to programmable LED light fixtures that may be used for vehicle lighting and other applications, as standalone units, and in a coordinated series of fixtures.

BACKGROUND OF THE INVENTION

Vehicle marker lights have long been used to signal, for example, emergency (e.g., tow trucks and police or fire vehicles) and maintenance vehicles (e.g., street sweepers), as shown, for example, in U.S. Pat. Nos. 3,484,598, 3,692,998, 5,299,102 and 6,858,986, each of which are entirely incorporated herein by reference. Incandescent lighting systems have traditionally been used for this purpose. But such systems are relatively inefficient and unreliable when compared to light emitting diodes (LEDs), which have an operating life of up to 100,000 hours before significant degradation. Recently, LED vehicle marker light systems have become more common. However, despite improvement over incandescent lighting systems, LED light systems can still be improved in order to offer greater benefits related to the operation of series of light fixtures in a coordinated manner. Further, LED light fixtures may suffer from inefficient light dispersion characteristics.

U.S. Pat. No. 6,858,986 issued Feb. 22, 2005 to the Assignee of this application, titled "Programmable LED Vehicle Marker Light Assembly," and also incorporated herein by reference in its entirety, discloses one programmable LED light system which is believed to be an improvement over known incandescent lighting system. However, further improvements are possible, as discussed below.

Accordingly, it is an object of the present invention to provide an improved design for light fixtures and light fixture systems in which the operation of the fixtures may be programmable, easy to use, reliable, incorporating LED technology, made of off-the-shelf components and standard circuits, durable, and having flexible lighting options, e.g., acting as both a marker light as well as emergency flashers, traffic control arrows, turn signals, strobes, etc. In addition, it would be desirable to improve current LED technology in order to apply the improved technology to applications other than those associated with traditional vehicle lighting. Further, it would be desirable to improve the light dispersion characteristics of LED light fixtures.

Definition of Claim Terms

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Emergency light" means lighting functioning as an emergency or warning light for the vehicle on which it is used.

"Lamp" means any device for transmitting light, including but not limited to LEDs, incandescent light bulbs, fluorescent light bulbs, halogen light bulbs, etc.

"LED" means a light emitting diode, a p-n junction solid state device which emits optical radiation when forward biased.

"Light fixture" means a plurality of lamps controlled by one or more microcontrollers.

"Marker light" means lighting functioning as a marker or clearance light for the vehicle on which it is used.

"Warning light" means an emergency light as defined above.

SUMMARY OF THE INVENTION

The objects mentioned above, as well as other objects, are solved by the present invention, which overcomes disadvantages of prior light assemblies, while providing new advantages not previously obtainable with such assemblies.

In one preferred embodiment of the present invention, a light assembly is provided that may serve a dual role as a marker light, and alternatively as an emergency or warning light for a vehicle. A preferred light assembly may include a plurality of light fixtures, with each fixture including a plurality of lamps such as LEDs controlled by a microcontroller, and with the light fixtures being in electrical communication with each other. One or more of the microcontrollers may be programmed to operate the light fixture in which it is housed and to communicate instructions for operating succeeding light fixtures.

In a preferred embodiment, the plurality of light fixtures may be driven by a relatively constant current drive even in the presence of fluctuating voltages, such as but not limited to voltage fluctuations of 8-40 volts, for example. In response to receiving instructions from the microcontroller of the first light fixture in a series, succeeding light fixtures may be caused to operate in one or more operating modes, one of which modes is preferably an "on" mode. In this manner, for example, the light fixtures may be caused to function as marker lights, or as emergency or warning lights, at an operator's control and discretion.

In a particularly preferred embodiment, the light fixtures may retain a substantially similar illumination and may be driven by a relatively constant current drive. In still another embodiment, the lamps may be hermetically sealed in a corresponding fixture using ultrasonic welds and possibly other sealing devices (O-rings, etc.).

In another preferred embodiment, the light fixtures may include one or more lenses. Each lens may be configured to allow light emitted from the lamps to pass through the lens. Reflectors may be used to change the angle of the light transmitted by the lamps, along with retroreflectors (e.g., corner cubes) causing exterior light to be reflected from the lens in the same color as the light emitted from the lamps. Each lens may be colored to match the wavelength emitted by one or more of the lamps, and may also be configured to emit the same color when exposed to sunlight. In one embodiment, the lamps may function as marker lights with a specified visibility at 45-degrees left and right from straight-on.

In another embodiment, the first light fixture in series may function as a master unit, and successive light fixtures in the series may serve as its slave units, such that functioning of the master unit in one operating mode (e.g., as a marker or an emergency light) may cause the slave unit to function in a corresponding operating mode. The detected presence of a static condition may cause an incoming control input to be passed to the master unit and to its slave unit(s), causing the units to display in a manner indicated by the control input. Any of the following, as examples, may trigger a static condition: loss of signal from a microcontroller associated with the fixtures; a steady battery voltage on an incoming control lead associated with the fixtures; or a floating voltage on an incoming control lead associated with the fixtures. The detected presence of a static condition may also cause one or more of the fixtures to initiate an arbitration sequence in which each fixture may determine whether it should act as a master unit.

In yet another embodiment, the light assembly may employ a protocol in which a first fixture in a series functions as a master unit, unless the first fixture is defective, in which event a next fixture in the series functions as a master unit. Voltage applied to a master unit may cause it to function as a marker light. The act of grounding may cause the first fixture in a series of fixtures to function as the master unit. Further, the master unit may cause its corresponding slave units to function in an alternating flash pattern in which every other fixture is on for a predetermined period of time, and then off for a predetermined period of time. The input current transmitted to the lamps may be limited to a predetermined, substantially fixed amount, thereby decreasing impedance needed for external loads to be treated as a grounding of the incoming control lead.

In another embodiment, a current source for one the light fixtures may be caused to operate in a non-linear range for relatively low level loads in the range of 9-32 volts, for example, providing a non-linear voltage drop relative to the current on the incoming control lead and enabling the light assembly to function with an impedance on the incoming control lead that would be caused by submerging the control lead under tap water (rain or snow melt may also be used).

In yet another embodiment, the light assembly may be configured to employ a communication protocol that recognizes a dominant signal and a recessive signal. The dominant signal may be a voltage between ground and a first fraction of the power source voltage, while the recessive signal may be a voltage between a second fraction of the power source voltage, greater than the first fraction, and substantially near the power source voltage.

Preferably, a control input includes a start signal following by a series of pulses, indicating a desired operating mode for each of the light fixtures in a series. The light fixtures may include a failure operating mode that is run in the event a bypass associated with the one or more of the fixtures fails, causing fixtures in series subsequent to the fixture whose bypass failed to function according to the failure operating mode.

In a preferred embodiment, detection of the failure operating mode may cause one or more of the following events to occur:
  (a) an open circuit on an outgoing control lead associated with the one or more of the fixtures, and occurrence of a recessive signal on an incoming control lead associated with the one or more of the fixtures, which is transmitted to succeeding fixtures in a series, causing the succeeding fixtures to default to an "on" mode following a predetermined delay period; or
  (b) creation of a ground on an outgoing control lead associated with the one or more of the fixtures, and occurrence of a dominant signal on an incoming control lead associated with the one or more of the fixtures, which dominant signal is transmitted to succeeding fixtures in a series, causes a succeeding fixture to become a master unit following a predetermined period of time, after which the master unit provides a default sequence for succeeding fixtures in the series.

Using a preferred light assembly, a current source associated with the light fixtures is capable of handling relatively large voltage inputs in order to maintain a substantially constant current provided to the light fixtures, such as handling input voltages of between about 8 and 90 volts while maintaining a substantially constant current between about 5 mA and 20 mA.

A system for operating a lighting assembly also forms a portion of the present invention, and includes a power source, and a plurality of light fixtures connected in series via a communication bus. A microcontroller may be used and configured to receive information related to the number of fixtures in the series, and a desired operating mode. The microcontroller may also be configured to provide a control signal including a plurality of operating signals with information related to the desired operation of the light fixtures in the series. A constant current regulator may be configured to provide reference voltages for operating the microcontroller from the power source. The control signal's duration may be determined by the number of fixtures in the series. Operation of the fixtures need not depend upon foreknowledge of the address or state of the fixtures in the series.

A system including one or more groups of lighting fixtures, with each of the one or more groups including fixtures connected in series, also forms part of the present invention. This system may include a microcontroller, and a bypass circuit configured to pass on operating instructions to successive fixtures within a group in the event of an error in the operation of the microcontroller. An illuminator array including one or more of the groups of lighting fixtures, such as lamps, may be employed. One or more array drives may also be used for operating the illuminator array. The array drives may be DC-to-DC converter, providing a generally constant current source for each of the lamps in the series, and providing reverse polarity protection. A transceiver may be configured to receive operating control signals and to transmit control signals to succeeding fixtures within a group. The illumination provided by the illuminator array preferably remains generally constant over a given DC voltage range, such as (but not limited to) a DC voltage range of between about 8 and 32 volts.

In another embodiment of the invention, a system is provided that includes a microprocessor, and an illuminator array of one or more groups of lighting fixtures, with each of the groups of lighting fixtures being connected in series. The system may provide a logic signal for operating the fixtures. The logic signal may include a start signal corresponding to a prior mode, and a plurality of operating status signals in a first range indicating a recessive signal, and in a second range indicating a dominant signal. The operating status signals may correspond to operating modes that include "ON" and "OFF" operating modes for the illuminator array. For example, the logic signal may have a duration of between about 120-180 milliseconds and may be repeated without an intervening time period. The duration and timing of the logic signal may be adjusted to coordinate with the number of fixtures within each group of fixtures in series. Further, the operating status signals may be configured to implement a lighting mode for each of the groups of the fixtures.

In still another embodiment of the invention, a method is provided for using a computer readable medium arbitration system for determining whether a fixture operated in a series of fixtures will operate as a master unit or a slave unit. The operation of the system may be initiated from a main loop of a processor. The timer may be initiated, and it may be determined whether an incoming signal is recessive. An illuminator array may be lit upon receipt of a constant recessive signal. The operation of a fixture as a slave unit may be initiated upon the receipt of a dominant incoming signal followed by a recessive signal. The operation of a fixture as a master unit may be initiated upon the receipt of a constant dominant signal. The timer may be reinitiated if the fixture does not become a master unit.

In yet another embodiment of the invention, a method is provided for determining whether a fixture operated in a series of fixtures will operate as a master unit or a slave unit. The operation of the first fixture as a master unit may be initiated. A start signal may be outputted. It may be determined whether a previously received operating status for a first fixture is valid. The first fixture may be operated according to a valid previously received operating status. A counter associated with a plurality of currently received operating status signals may be incremented. A plurality of "ON" and "OFF" operating status signals for the series of fixtures after the first fixture may be outputted. In an alternative embodiment, the first fixture may be first operated according to the previously received operating status when the previously received operating status is valid, and the first fixture may be configured to provide operating signals for successive fixtures in the series according to the next operating status.

In a further embodiment, a method is provided for determining whether a fixture operating in a series of fixtures will operate as a master unit or a slave unit. Operation of a fixture as a slave unit is initiated. A bypass associated with the fixture is disabled. It is determined whether a previously received operating status for the fixture is valid. The fixture is operated according to a valid previously received operating status. It is determined whether an incoming signal is dominant or recessive. After differentiating between an "ON" and an "OFF" next operating status, the fixture is first operated according to the previously received operating status when the previously received operating status is valid, and the fixture is then operated according to the next operating status.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 15B is a block diagram of an embodiment of the second microcontroller of FIGS. 10 and 13, including programs that may be stored in a memory element, programs such as an arbitration and clocking system, a master operating system, and a slave operating system;

FIG. 16 is a flowchart of the arbitration and clocking system of FIG. 15B;

FIG. 17 is an illustrative representation of a serial bit stream that may be employed for communicating information in, and between, the system controller of FIG. 1 and a plurality of light fixtures such as the fixtures of FIGS. 1 and 2A;

The components in the drawings are not necessarily to scale, emphasis instead being placed upon clearly illustrating the principles of the present invention. In the drawings, like reference numerals designate corresponding parts throughout the several views.

DETAILED DESCRIPTION OF PREFERRED EMBODIMENTS

Set forth below is a description of what are believed to be the preferred embodiments and/or best examples of the invention claimed. Future and present alternatives and modifications to the preferred embodiments are contemplated. Any alternatives or modifications which make insubstantial changes in function, in purpose, in structure, or in result are intended to be covered by the claims of this patent.

Figure 1:
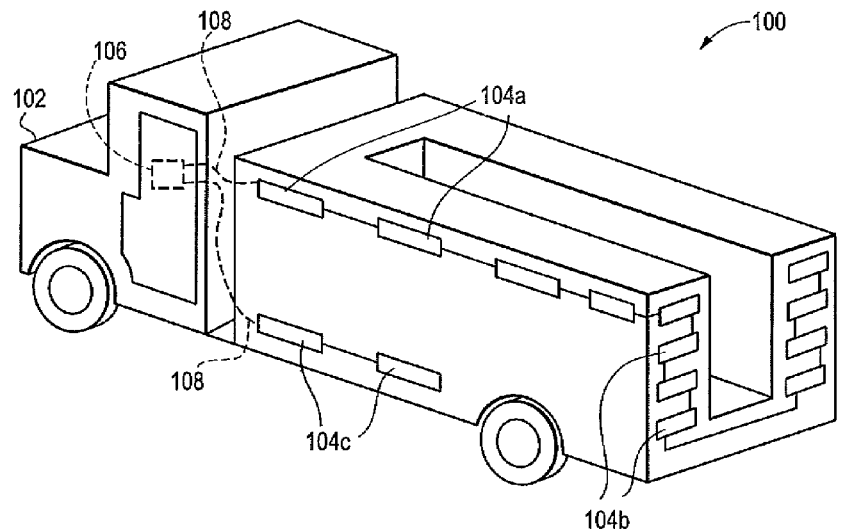
FIG. 1 is representative view of a vehicle employing an embodiment of the invention that may include a system controller and several types of light fixtures.

Referring initially to FIG. 1, a representative view 100 of a vehicle is provided. In the representative view 100, a truck 102, employing an embodiment of the invention is shown that may include a system controller 106 and a plurality of light fixtures 104a, 104b, and 104c. System controller 106 may provide control wiring to light fixtures 104 via system cable(s) 108. In another embodiment, system controller 106 may be a wireless unit in communication with fixtures 104 configured to receive and transmit data via wireless communication systems.

As described in greater detail below, fixtures 104 may be employed in a large number of applications. As non-limiting examples associated with vehicle lighting, as shown in FIG. 1, the first type of fixture 104a may be configured to mount on a top-side portion of truck 102, and may be programmed and placed to provide an easily visible outline for truck 102 when ambient light is limited. The second type of fixture 104b may be configured to mount on a rear portion of the truck 102, and may be programmed to operate in conjunction with and/or as an alternative to standard brake and signaling lamps. Fixture 104b may also be programmed and placed to provide an easily visible outline for truck 102 when ambient light is limited. The third type of fixture 104c illustrated in FIG. 1 may be configured to mount on a side portion of truck 102.

Figure 2A:
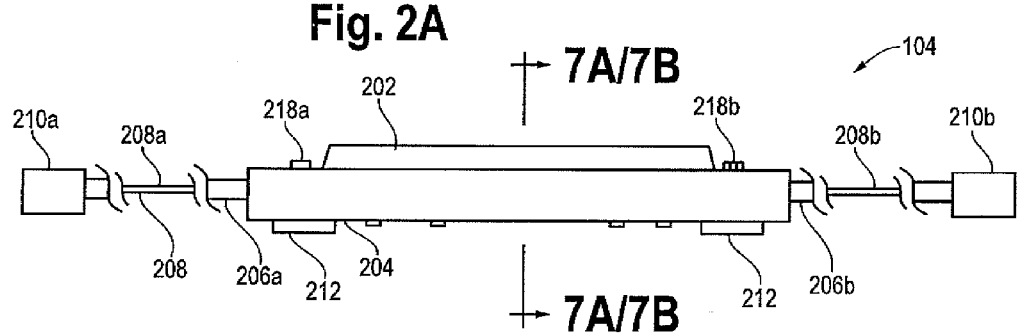
FIG. 2A is side view of a light fixture, including a lens, that may represent any of the types of fixtures shown in FIG. 1.

As illustrated in FIG. 2A, fixture 104 may include a lens 202, and an illuminator housing 204. Incoming power and control wiring 208a may pass from an incoming plug 210a to illuminator housing 204 via incoming cable 206a. Similarly, outgoing power and control wiring 208b may pass from illuminator housing 204 to outgoing plug 210b via outgoing cable 206b. Fixture 104 may also include locks 212 and lock shafts 218a (shown in an unlocked position) and 218b (shown in a locked position) for securing the illuminator housing 204 to a cover 308 (shown in FIG. 3) for wiring 208.

As illustrated in FIG. 1, a plurality of light fixtures 104 may be connected in series. As further described in detail below, in addition to lighting functions previously mentioned, light fixtures 104 may be programmed to operate in a plurality of programmable patterns or modes intended to provide visibility and/or to convey information. A plurality of light fixtures may be connected in series by connecting the outgoing plug 210b of a first fixture 104 to the incoming plug 210a of a succeeding fixture 104. In other embodiments, a single fixture 104 may operate in isolation from other fixtures. In other embodiment, a plurality of light fixtures 104 may operate in parallel. As non-limiting examples, a plurality of light fixtures 104 operating in parallel may include fixtures located on the left and right side of truck 102, and fixtures located on the upper and lower part of truck 102.

Figure 2B:
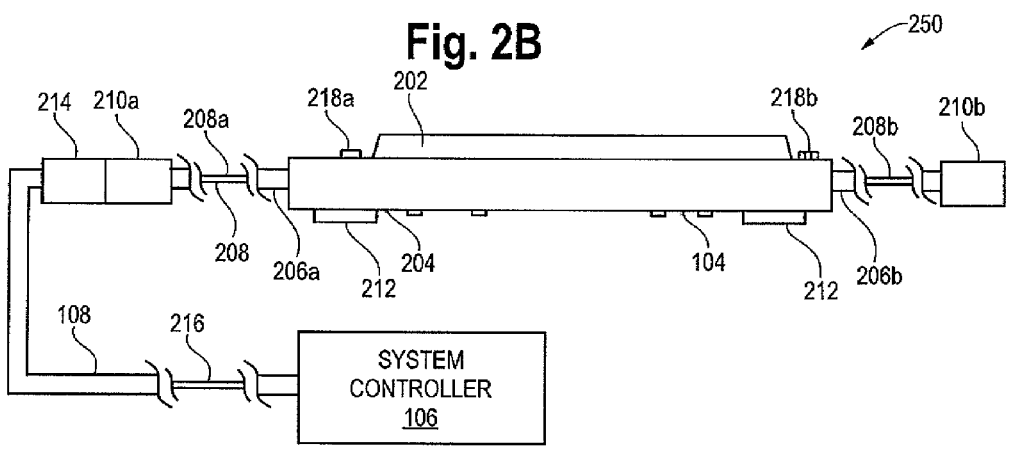
FIG. 2B is side view of a controlled system that may include the system controller of FIG. 1 and the light fixture of FIG. 2A.

Illustrated in FIG. 2B is side view of a light assembly controller system 250 that includes system controller 106 and light fixture 104. In addition to components previously discussed, controller system 250 may include wiring 216 that may pass from system controller 106 to control plug 214 via system cable 108.

Figure 3:
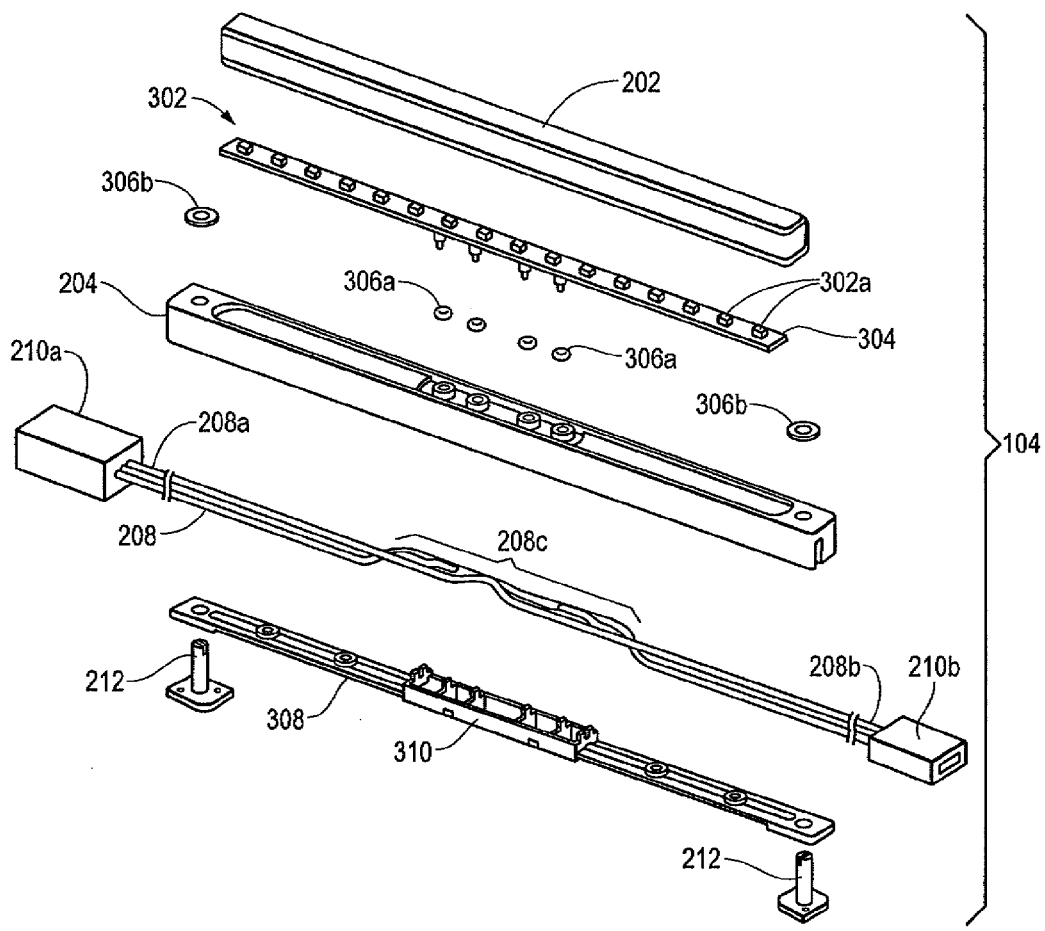
FIG. 3 is an exploded view of the light fixture of FIGS. 2A and/or 2B that may include power and control leads in a switching housing, an illuminator housing, and a circuit board.

As shown in FIG. 3, in addition to components previously shown in FIG. 2, fixture 104 may include an illuminator array 302, which may include one or more lamps 302a, mounted on a circuit board 304, O-rings 306a, hardware 306, cover 308, and switching housing 310.

Lamps 302a may be lamps such as, but not limited to, Light Emitting Diodes (LEDs), air gap LEDs, GaAs LEDs, polymer LEDs, and non-LED lamps known to those having ordinary skill in the art. Lamps 302a may be high lumen and rated for extended service life. For example, lamps 302a may be rated for 100,000 hours of service life. In a preferred embodiment, a plurality of lamps 302a are used in which the illuminator array 302 may consume about 100 milliamps, and may last 5-10 years in normal usage (e.g., such LEDs are available from, for example, Avago Technologies, part no. HSMA-A431; Accede part no. SDM-YUHD311TR-WPE, Lite-On of Taipei, Taiwan, part number LTST-C930KSKT; or Kingbright, City of Industry, Calif., part numbers APTD3216SYC, AM2520SYC03). Lamps 302a may be durable, as well as reliable, and tested for use in operating temperatures of −40° F.-180° F.

Circuit board 304 may be secured in illuminator housing 204 and covered by lens 202. Illuminator housing 204 may be secured to cover 308 by using snap fits and welded posts (not shown), for example by using four welded posts. Lock shafts 218a and 218b (see FIGS. 2A and 2B) cooperating with locks 212 may be used to attach the illuminator array 302 to a receiving part. A switching housing 310 may be incorporated into cover 308 for enclosing an internal portion 208c of wiring 208. O-rings 306a and retainer 306b may be used to secure the fixture 104 components to each other in a manner appropriate for outdoor use with a vehicle, such as truck 102, to secure locks 212 to illuminator housing 204 with lock shafts 218a and 218b.

In a preferred embodiment illustrated in FIG. 3, lamps 302a of illuminator array 302 may be arranged in a single row on a circuit board 304 having dimensions of approximately one-half inch by nine inches. In other embodiments, lamps 302a may be arranged in other patterns and shapes.

Figure 4A:
FIG. 4A is a top view of the lens of FIG. 2A.
Figure 4B:
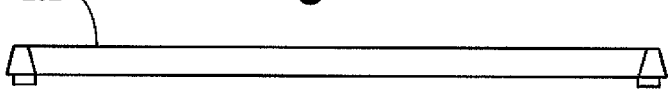
FIG. 4B is a side view of the lens of FIG. 2A.

Illustrated in FIGS. 4A and 4B is a top and side view, respectively, of lens 202. Various components, such as lens 202 and housing 204, may be constructed from materials such as but not limited to polycarbonates. The color of lens 202 is not limited and may be typical colors such as amber, red, and clear. In one embodiment, lens 202 may be colored such that the color matches the wavelength emitted by lamps 302a. Such a color selection may minimize absorption of the light output from lamps 302a. Further, such a color selection may permit a consistent color under varying ambient light conditions, such as but not limited to a lack of exterior light, daylight, when fixture 104 is illuminated by lights on other vehicles, and other exterior illumination sources.

Figure 20:
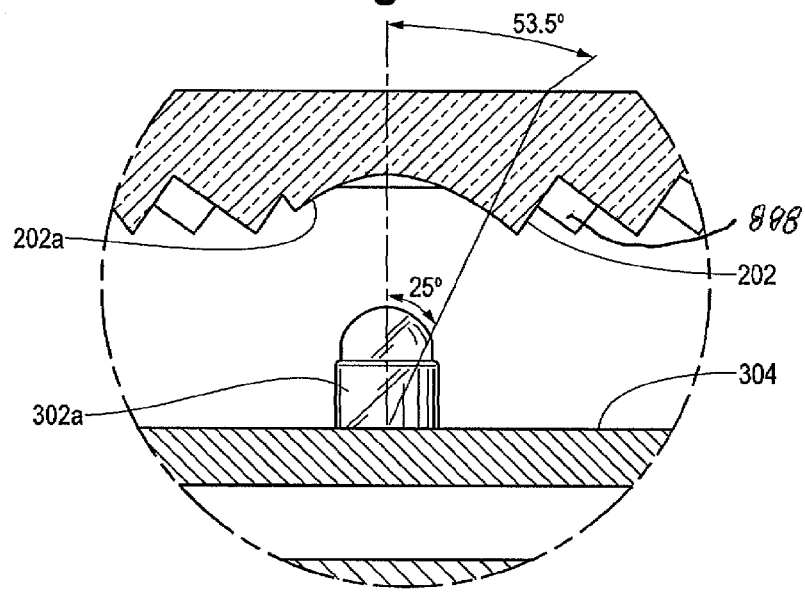
FIG. 20 is a partial sectional view taken along reference line 20/20 of FIG. 7A.
Figure 21:
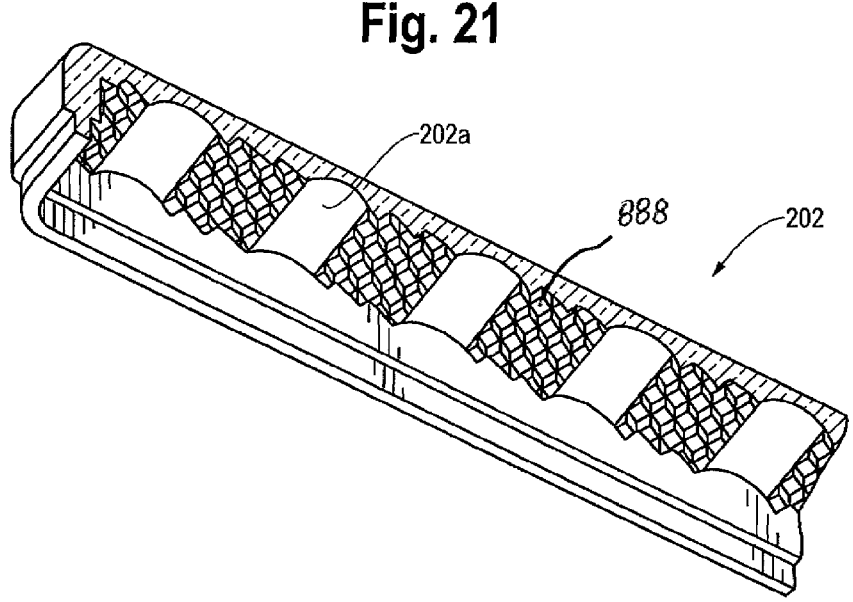
FIG. 21 is a partial cut-away reverse view of the lens shown in FIG. 3.

In another embodiment, lens 202 may include optical features that result in beneficial light distribution patterns. In the preferred embodiment, and referring now to FIGS. 20 and 21, cylindrical lens 202a may be formed into the interior of lens 202, and may be aligned with LED lamps 302a mounted on PC board 304 to direct the output of lamps 302a into a desired illumination pattern. In this embodiment, these lenses may take the (e.g.) 30-degree angle of the light exiting the LED and bend it to an angle in excess of 45-degrees. Federal regulations SAE J592 and J2042 require that marker lights have specified visibility at 45-degrees left and right from straight-on. The LED used in this design sends little or no light in that direction without this feature. Previous lenses did not satisfy these highway standards. Referring to FIG. 20, portions of lens 202 may also include retro-reflectors 202b to capture and redirect exterior lighting sources, such as but not limited to headlights, to the interior of lens 202 in order to allow the light to exit from lens 202, preferably of the same color as lens 202. Referring to FIG. 21, reflector corner cubes 888 constitute part of the lens, are commonly used in the lens industry for creating retro-reflectors, and may be employed to capture and redirect exterior lighting sources to the interior of lens 202.

Figure 5:
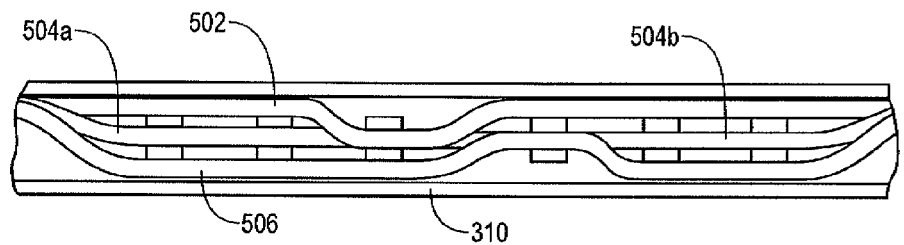
FIG. 5 is a bottom view of the switching housing and power and control leads of FIG. 3.

FIG. 5 shows a bottom view of the switching housing 310 that illustrates the internal portion 208c of wiring 208. The wiring 208 may include a power lead 502, an incoming control lead 504a, an outgoing control lead 504b, and ground lead 506. In various embodiments of fixture 104, power lead 502 may provide a variety of voltages, including typical vehicle voltages such as 12-Volt direct current and 24-Volt direct current from a power source 812 (see FIG. 8), which may be, but is not limited to, a battery and a dynamic power source. Fixture 104 may also be capable of operating within a variety of voltage ranges provided by power source 812, for example but not limited to, a range of 8-32 Volts of direct current.

If a plurality of fixtures 104 are connected in series, control leads 504a and 504b for each of the fixtures 104 may be considered as a communication bus that may allow the operation of the series of fixtures 104 in a coordinated manner. The coordinated manner may include operating modes such as, but not limited to, operating as strobes, flashing, sequences, directional arrows, turn signals, traffic control arrows, wigwags, chase lights, SOS (using, e.g., Morse Code), and other patterns.

Figure 6:
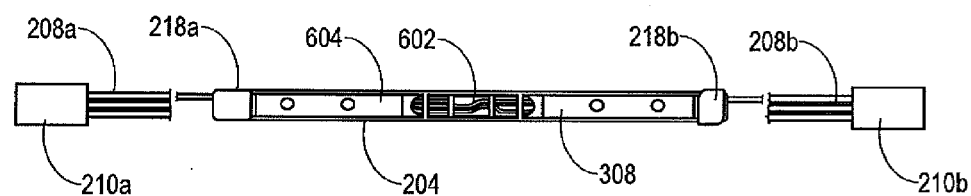
FIG. 6 is a bottom view of the illuminator housing of FIG. 3.

FIG. 6 shows a bottom view of fixture 104 illustrating incoming plug 210a, incoming wiring 208a, illuminator housing 104, cover 308, outgoing wiring 208b, and outgoing plug 210b. Foam tape 604 may be placed on cover 308, to take-up play in attaching the assembly in the receiving part of certain installations when using locks 212. The foam tape also adds friction for horizontal positioning in these same installations. The foam tape can also be used to mount the assembly with or without the use of locks 212. Locks 212 may also be removed for mounting with screws, with or without the use of the foam tape.

Figure 7A:
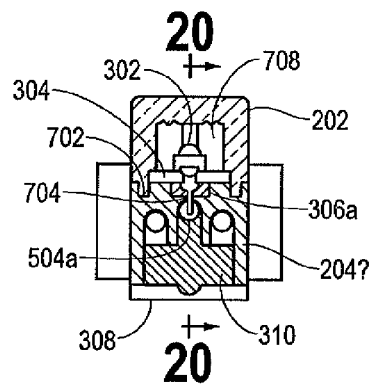
FIG. 7A is a first sectional elevation of the light fixture taken along reference line 7A/7A of FIG. 2A in which an ultrasonic weld method is used to seal the fixture components.
Figure 7B:
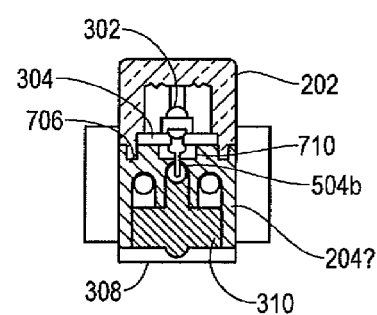
FIG. 7B is a second sectional elevation view of the light fixture taken along reference line 7B/7B of FIG. 2A in which a gluing compound method is employed to seal the fixture components.

FIG. 7A shows a sectional elevation view of an embodiment of light fixture 104 in which an adhesive 702 is employed to secure lens 202 to illuminator housing 204. FIG. 7A also illustrates a contact 704 from circuit board 304 extending to incoming control lead 504a. FIG. 7B shows a sectional elevation view of a second embodiment of light fixture 104 in which an ultrasonic weld 706 is employed to secure lens 202 to illuminator housing 204.

Lens 202 may be secured to illuminator housing 204 in a plurality of manners, such as but not limited to employing the adhesive 702 of FIG. 7A and employing an ultrasonic weld 706 of FIG. 8B. Other welds may be used, such as friction welds, spin weld, vibration welds and induction welds. In one embodiment, a central area 602 of fixture 104 may be filled with potting compound, for example a polyurethane potting compound, after placing circuit board 304 in illuminator housing 204. In other embodiments, the potting compound may be omitted.

Circuit board 304 may be hermetically sealed in fixture 104 in order to protect the circuit board 304 and associated electrical devices from the environment in which vehicles, such as truck 102, may operate. In one embodiment, contact pins, such as contact pin 704, from circuit board 304 may be the only extension from the hermetically sealed area 708. Similar contact pins may be employed to connect circuit board 304 to power lead 502, incoming control lead 504a, outgoing control lead 504b, and ground lead 506. Contact pins may be sealed by means that include O-ring 306a, as shown in FIG. 7A, and/or potting compound 710 as shown in FIG. 7B. Pins 704 may be used to displace the insulation of the wire leads to make electrical contact with the internal conductive strands of wire.

Although described above in regard to use with a vehicle, embodiments of fixture 104 and system controller 106 may also be suitable for use in applications such as, but not limited to, marker lights, clearance lights, tail lights, brake lights, turn lights, interior and exterior lighting systems, tool box lighting systems, emergency light bars, integrated light bars; strobe lights; wireless light bars, custom hazard lighting, directional lighting, custom tail light system modules, emergency exit lighting, battery and solar backup lighting systems, custom lighting devices for vehicle enhancement such as vehicle audio light shows, motorcycle lighting, marine signal lighting, custom road flares, roadside hazard lighting, construction safety lighting, personnel safety lighting, hazardous turn lighting, road embedded hazard lighting for various conditions such as dangerous curves, fog conditions, and other road visibility conditions, railroad crossings, crosswalks, traffic signals, bus stop lighting, safety and security lighting systems, building tower hazard lighting, decorative lighting, landscape lighting, recreational lighting, walkway safety lighting, emergency exit lighting systems, street lighting, swimming pool lighting, airports runway and strobe lighting, marine lighting, dock lighting, portable runway lighting systems and strobes, signal lighting, lighting code systems, battlefield personnel IFF code systems, and additional lighting system including those that may benefit from low power consumption, and/or lighting systems capable of operating in patterns.

Figure 8:
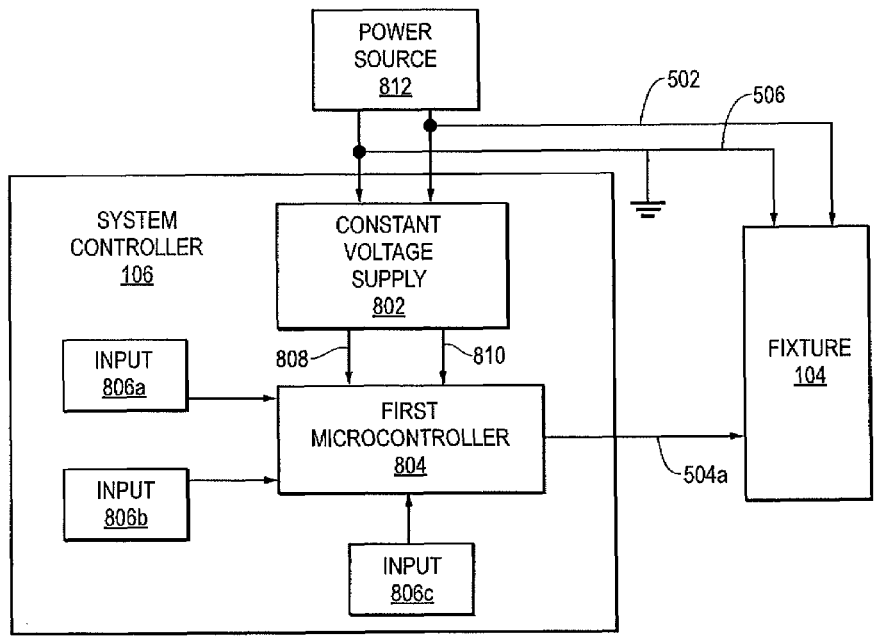
FIG. 8 is a block diagram of a lighting fixture and the system controller of FIGS. 1 and 2B, including a constant voltage supply and a first microcontroller.

FIG. 8 shows a block diagram of system controller 106, fixture 104, and power source 812. System controller 106 may include a constant voltage supply 802, a first microcontroller 804, a first control input device 806a, second control input device 806b, and third control input device 806c.

In the embodiment shown in FIG. 8, system controller 106 may provide incoming control lead 504a to fixture 104, while power source 812 provides power lead 502, and ground lead 506 to controller 106 and fixture 104. In other embodiments, power source 812 may provide power and ground to system controller 106, and controller 106 provides power 502 and ground 506 to fixture 104 through system cable 108.

In one embodiment, first control input device 806a may be used to select from a plurality of lighting modes, while second input device maybe used to designate the number of fixtures 104 for a repeat pattern in a series of fixtures 104 associated with system controller 106, and third control input device 806c may be used to provide the user with a means to download additional lighting modes. However, the functions of inputs 806a, 806b, and 806c may be interchanged, combined, and modified depending upon the desired operating characteristics of fixture 104, individually and when used in series. Though shown as a single fixture 104 in FIG. 8, system controller 106 may control 504a for the first of a series of fixtures 104.

Figure 11:
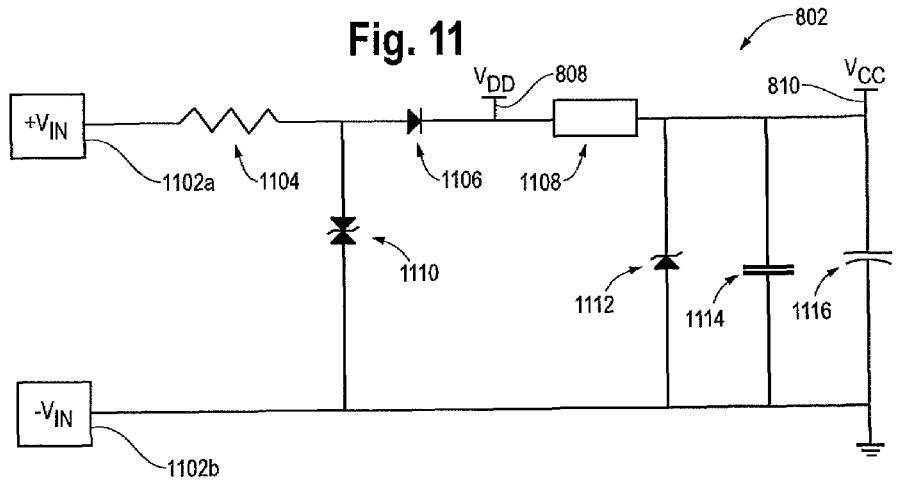
FIG. 11 is a block diagram of the constant voltage supply of FIG. 8.

Referring to FIGS. 8 and 11, constant voltage supply 802 may provide a constant voltage power source as reference voltages for microcontroller 804. Constant voltage supply 802 provides first reference voltage level ($V_{CC}$) on lead 808 and second voltage reference level ($V_{DD}$) on lead 810.

Figure 9:
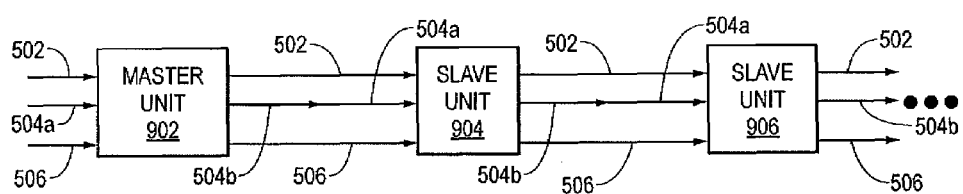
FIG. 9 is a block diagram of a possible operating architecture for the light fixtures of FIG. 1 and/or the controlled system of FIG. 2A.

FIG. 9 shows an embodiment of a control architecture 900 for a series of fixtures 104, and/or a system controller 106 and a series of fixtures 104. In the embodiment illustrated, a master unit 902, and a plurality of slave units, partially illustrated as first slave unit 904 and second slave unit 906, may each constitute a fixture 104 as previously described herein. In another embodiment, master unit 902 may be a system controller 106 as previously described herein. In the preferred embodiment, system controller 106 sends the control sequence that is received by all fixtures as slaves.

Still referring to FIG. 9, in an embodiment consistent with control architecture 900, during normal operation, master unit 902, first slave unit 904, and second slave unit 906 may operate as traditional marker or clearance lights in the absence of a signal on incoming control lead 504a. However, when a voltage is applied (e.g. by the vehicle battery) to incoming control lead 504a of master unit 902, the master unit 902, slave units 904 and 908 and any succeeding slave units may sequence together and flash on and off in, for example, a single, pre-programmed sequence, turning the lights into emergency flashers. The master unit 902 and slave units may continue to flash until the voltage is removed from incoming control lead 504a of master unit 904. A preferred flash cycle time may be about 1-10 flashes/second and, more preferred, about 5-10 flashes/second. (At about 10-15 flashes/second, the human eye cannot distinguish continuous light from flashing light.) Other flash rates may be desirable for other applications, such as in environments where it is not important for the flashes to be discerned by humans.

In this embodiment, bringing incoming control lead 504a to positive voltage for the vehicle, or letting it float, causes all fixtures to function as standard marker lights. Grounding 504a causes the first fixture to become the master, and all other fixtures will do what the master instructs with the control sequence. In the current preferred embodiment, the master runs all of the other fixtures in an alternating flash pattern in which every other fixture is on for one-half second, then off for one-half second. The master firmware may determine what pattern is sent by the master as a default.

Figure 10:
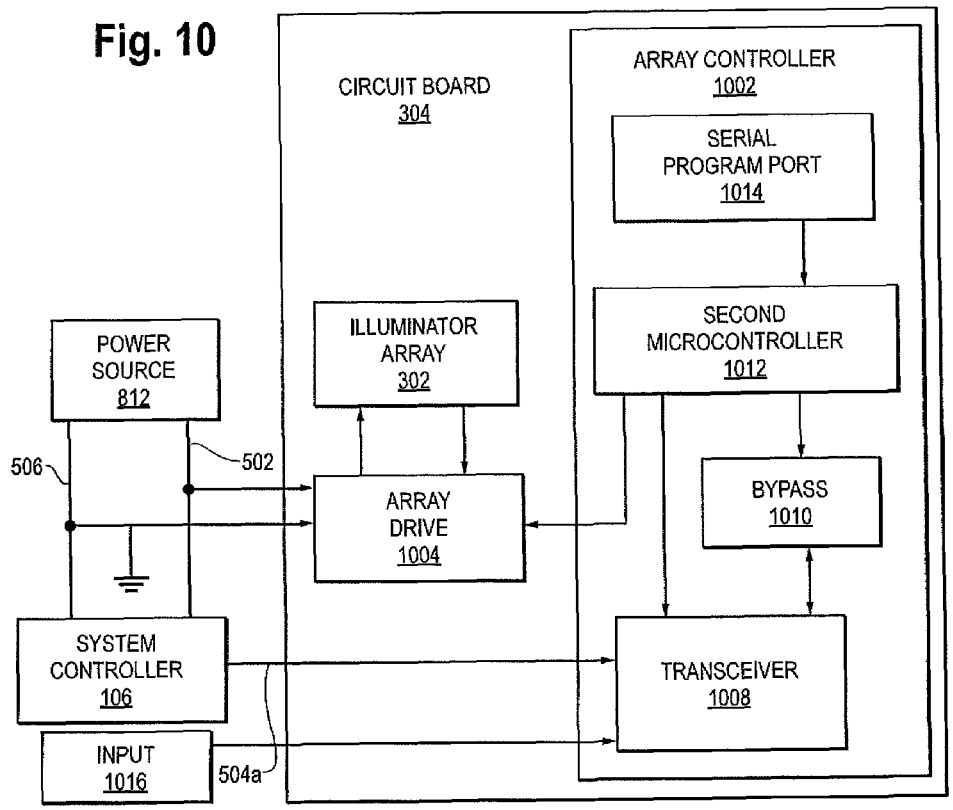
FIG. 10 is a block diagram of the system controller of FIG. 1 and a portion of the circuit board of FIG. 3, including an array drive, an illuminator array, and an array controller including a second microcontroller.

FIG. 10 shows a block diagram of system controller 106 and a portion of circuit board 304, and input device 1016. Circuit board 304 may include an array controller 1002, an array drive 1004, and illuminator array 302. Circuit board 304 may receive incoming control lead 504a from system controller 106, as shown in FIG. 10, or from another fixture 104. Circuit board 304 may receive power lead 502 and ground lead 506 from power source 812.

In other embodiments, circuit board 304 may receive power lead 502, incoming control lead 504a, and ground 506 from system controller 106. In additional embodiments, fixture 104 may receive only power lead 502 and ground 506 from power source 812. For example, when the fixture 104 is at the beginning of a series of fixtures 104, circuit board 304 may receive power lead 502 and ground lead 506 from power source 812. For additional fixtures in the series, circuit board 304 may receive power lead 502, incoming control lead 504a, and ground lead 506 from the prior fixture 104 in the series.

Array controller 1002 may include a transceiver 1008, a bypass circuit 1010, a second microcontroller 1012, and a serial program port 1014. Microcontroller 1012 may be configured to control the status of illuminator array 302. The status of illuminator array 302 may include whether the lamps 302a are fully illuminated, un-illuminated and/or whether the lamps 302a are dimmed.

In one embodiment, transceiver 1008 and transmitter 1206 (see FIG. 12) may be Local Interconnect Network (LIN) transceivers where LIN is a serial communication protocol designed to support automotive networks that may be employed in conjunction with a Controller Area Network (CAN). Such communication protocols are known to those having ordinary skill in the art. LIN enables cost-effective communication when all the features of CAN are not required.

The termination on the input signal (e.g., see receiver 1008a on FIG. 13) has been enhanced over that disclosed in U.S. Pat. No. 6,858,986, by using a current source scheme. This technique limits the input current to a fixed amount, increasing the dynamic range of the input for external loads. For low level loads, the current source preferably operates in a non-linear range, providing a non-linear voltage drop relative to the load current. The effect of this scheme is to provide a tolerance to a 1 k ohm load from the input to either power rail without violating the input thresholds. In comparison, a 470 ohm (or less) resistor would need to be used to properly terminate the input. Over an operational range of 9V to 32 volts, for example, this component would need to be sized for two watts of dissipation, resulting in increased power usage and heat dissipation. The effect of this is to enable the light assembly to function while submerged in tap water (which is roughly equivalent to a 1 k ohm resistance), or rain or snow melt.

In one preferred embodiment employing the LIN protocol with transceiver 1008, transceiver 1008 includes receiver 1008a and transmitter 1008b (see FIG. 13), and receiver 1008a may be configured to employ a communication protocol that recognizes a dominant signal and a recessive signal. The dominant signal may be a voltage between ground and 0.4 times the power source 812 voltage (where the power source 812 voltage may be referred to as "Vbat") on incoming control lead 504a (i.e., a relatively low voltage indicates a dominant state). The recessive signal may be a voltage between 0.6 times the power source 812 voltage to 1.0 volts less than the power source 812 voltage on incoming control lead 504a (i.e., a relatively high voltage indicating a recessive state). In such an embodiment, transmitter 1008b may be configured to provide a dominant signal as a voltage of approximately 0.2 times the power source 812 voltage on outgoing control lead 504b; and transmitter 1008b is configured to provide a recessive signal as a voltage of approximately 0.6 times the power source 812 voltage on outgoing control lead 504b.

Continuing with the description of the LIN protocol embodiment, a static recessive signal (0.6 Vbat through Vbat−1 Volt) received on incoming control lead 504a, may be reflected on outgoing control lead 504b indefinitely as a voltage at 1 Volt less than Vbat; while a static dominant signal (ground through 0.4 Vbat) received on incoming control lead 504a, may be reflected on outgoing control lead 504b for a preset time, for example 20 milliseconds, after which a recessive signal (1 volt less than Vbat) will again be provided on outgoing control lead 504b. Under the LIN protocol embodiment, the operation of fixture 104 may be determined by a static input control signal and/or a serial bit stream on incoming control lead 504a.

Referring back to FIGS. 1-10, in an embodiment in which a plurality of fixtures 104 are connected in series via wiring 208 in cable 206, power lead 502 and ground lead 506 provide battery power. Incoming control lead 504a may provide a control input for fixtures 104a in the series, while outgoing control lead 504b may be connected to the incoming control lead 504a of a next fixture 104 in the series.

Fixtures 104 in the series may include a bypass 1010 that receives the incoming control input and, in the event of a static condition, may pass on the incoming control input to outgoing control lead 504b. Static conditions include conditions such as, but not limited to, the loss of signal from microcontroller 1012 associated with the particular fixture 104, a steady battery voltage on incoming control lead 504a, and a floating voltage on incoming control lead 504a.

Under static conditions, the incoming control input may be passed on to each of the fixtures 104 in a series. Under static conditions, each fixture 104 after the first in the series may assume slave operation and light the illuminator array 302 associated with the fixture 104.

Under static conditions in which incoming control lead 504a is grounded, for a preset period of time, the fixtures 104 in the series may initiate an arbitration sequence in which each fixture 104 may determine whether it should act as a master unit 902. Under such conditions, the first fixture 104 in a series will generally become the master unit 902, unless the first fixture 104 is defective. In the event the first fixture 104 is defective, the next fixture 104 in the series will generally become the master unit 104. The master unit 902 will generally then provide a default lighting mode to the slave units 904, 906, etc., in the series. In another embodiment, system controller 106 may provide a lighting mode. The control input, generally a serial bit stream, for the lighting mode may include a start signal 1702 (see FIG. 17) followed by a series of pulses 1706 (see FIG. 17) indicating the desired operating mode of each fixture 104 in the series.

In one embodiment, fixture 104 may include a failure operating mode that is run in the event bypass 1010 fails. Thus, in a series of fixtures 104, fixtures subsequent to the fixture in which a bypass 1010 has failed may operate according to the failure operating mode. In a first failure scenario, the failure of a bypass 1010 may result in the creation of an open circuit on outgoing control lead 504b and the occurrence of a recessive signal on the incoming control lead 504a to succeeding fixtures 104 in a series of fixtures 104. Under the failure operating mode, the succeeding fixtures 104 may default to an illuminator array 302 "ON" mode after a delay period, for example a two second delay period.

In a second failure scenario, the failure of a bypass 1010 may result in the creation of a ground on outgoing control lead 504b and the occurrence of a dominant signal on the incoming control lead 504a to succeeding fixtures 104 in a series of fixtures 104. Under the failure operating mode, the succeeding fixture 104 after the defaulting bypass 1010 fixture 104 may become a master unit 902 after a period of time, for example, but not limited to, after one second. The master unit 902 may then provide the default sequence for the succeeding fixtures 104 in the series of fixtures 104. The series of fixtures 104 may thus appear as two independent flash sequences separated at the fixture 104 having a failing bypass 1010. Thus, the operation of succeeding fixtures 104 when a bypass 1010 fails may depend upon whether the failure results in the occurrence of a dominant or a recessive signal on outgoing control lead 504b.

Illustrated in FIG. 11 is a block diagram of an embodiment of constant voltage supply 802 for providing reference logic power voltages for microcontroller 804 (see FIG. 8). Constant voltage supply 802 may include a high power contact point 1102a, a low power contact point 1102b, a resistor 1104, a diode 1106, a high voltage temperature-compensated current source 1108, transient voltage suppressor 1110, a zener diode 1112, a capacitor 1114, and a capacitor 1116. Sub-circuit 1108 is a high voltage temperature-compensated current source, which provides the voltage protection required in an automotive environment, by effectively handling any large input voltage between 8 and 90 volts to maintain a constant current between 5 mA and 20 mA. Zener diode 1112 may then provide a regulated voltage for the circuit IC. Constant voltage supply 802 may provide a first reference voltage level ($V_{CC}$) on lead 808 and a second voltage reference level ($V_{DD}$) on lead 810 (see FIG. 8). Contact points 1102a and 1102b may be spade terminals.

In various embodiments of fixture 104, constant voltage source 802 may be configured to receive a variety of voltages on contact points 1102a and 1102b from power source 812, including typical vehicle voltages such as 12-Volt direct current and 24-Volt direct current.

Still referring to FIG. 11, in one non-limiting example, resistor 1104 may be a 22 Ohm resistor; diode 1106 may be an International Rectifier part No. MBRS1100TR, for example; current source 1108 is available from Super Tex, part No. CL28; transient voltage suppressor 1110 may be a Fairchild, part no. SMBJ70CA-13; diode 1112 may be a 3.3-volt zener diode; capacitor 1114 may be a 10-Volt rated 10 micro-Farad capacitor; and capacitor 1116 may be a 0.1 micro-Farad capacitor. High voltage temperature compensated current source 1108 may provide voltage protection in the vehicle environment. Current source 1108 may drop large voltage inputs to maintain a constant current. For example, current source 1108 may drop an input voltage between 8 and 90 volts to maintain a constant current between 5 mA and 20 mA. Diode 1112 may then provide a regulated voltage for constant voltage source 802.

Figure 12:
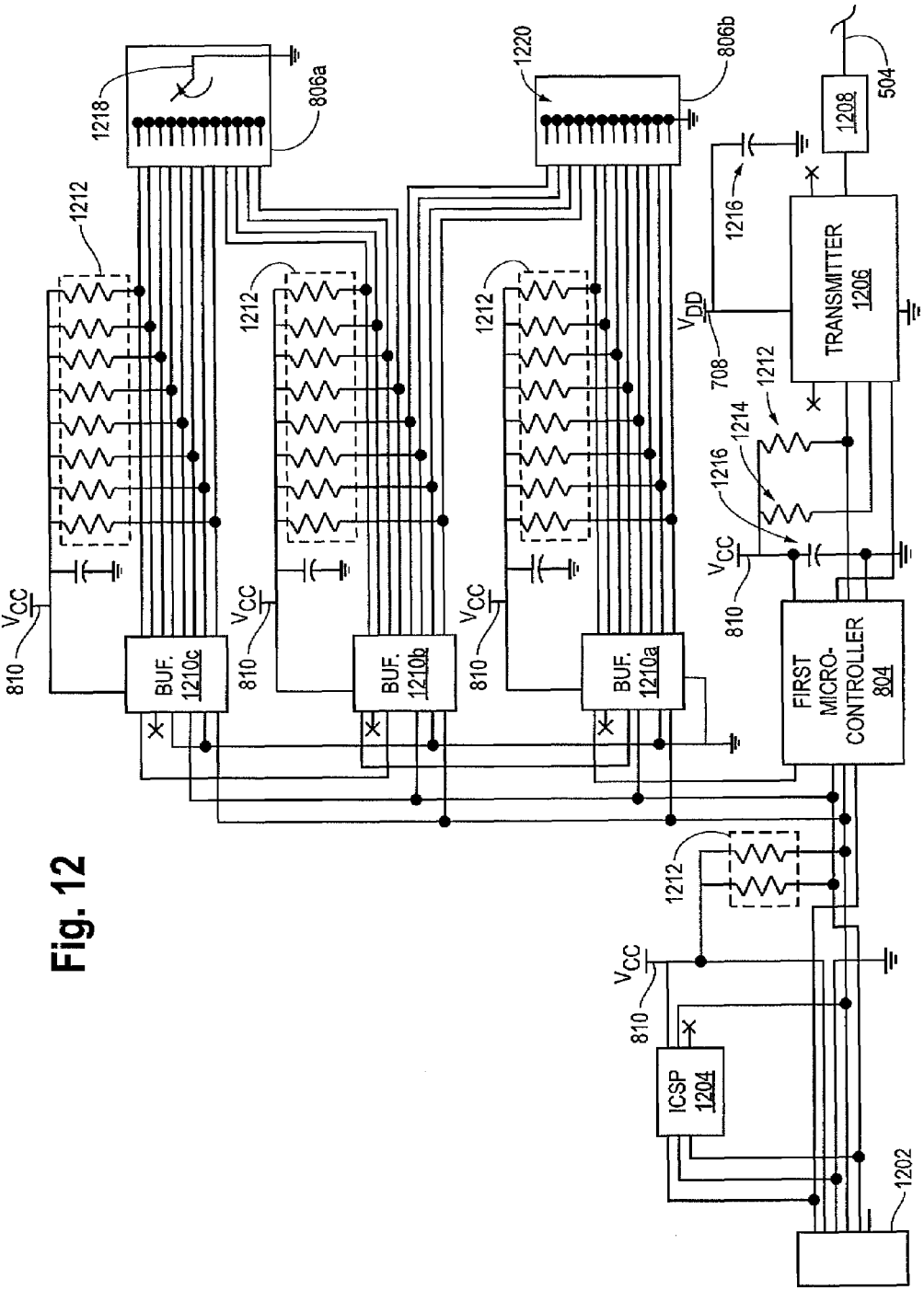
FIG. 12 is a schematic diagram of one potential embodiment of the system controller of FIG. 8.

Illustrated in FIG. 12 is an embodiment of a portion of system controller 106 including a junction point 1202, a serial program port 1204, first microcontroller 804, a transmitter 1206, an access point 1208 for control lead 504, buffers 1220a, 1220b, and 1220c, first control input device 806a, and second control input device 806b. System controller 106 may include a plurality of resistors 1212, that may be 10,000 Ohm resistors; a resistor 1214, that may be a 4700 Ohm resistor; and a plurality of capacitors 1216, that may be 100 nano-Farad capacitors.

First control input device 806a may include a selector switch 1218. Second control input device 806b may include a plurality of dipswitches 1220. In still other embodiments, input devices 806a and 806b may be configured to accept input from other sources such as, but not limited to, voice-activated inputs.

In one non-limiting embodiment, junction point 1202 may be a Tyco Electronics modular jack part no. 5555165-1; serial program port 1204 may be a Molex part no. 15-91-2060; microcontroller 804 may be an 8-Pin flash-based, 8-Bit, CMOS microcontroller available from Microchip Technology, part no. PIC12F683; transmitter 1206 may be a LIN bus transceiver from Maxim/Dallas, part no. MAX13020; access point 1208 may be a spade terminal; and buffers 1220a, 1220b, and 1220c may each be 8-bit parallel-in/serial-out shift registers from Fairchild Semiconductor, part no. 74HC165.

Still referring to FIG. 12, buffers 1210a, 1210b, and 1210c allow a large number of inputs to be available to microcontroller 804, which may have a more limited input port capacity. Junction port 1202 may have redundant inputs with field programming port 1204. The operation of microcontroller 804 is described further below and shown in FIGS. 14A and 16. Transmitter 1206 accepts the control input, generally in the form of a serial bit stream, from microcontroller 804 and makes the control input available to one or more fixtures 104 via access point 1208.

Figure 13:
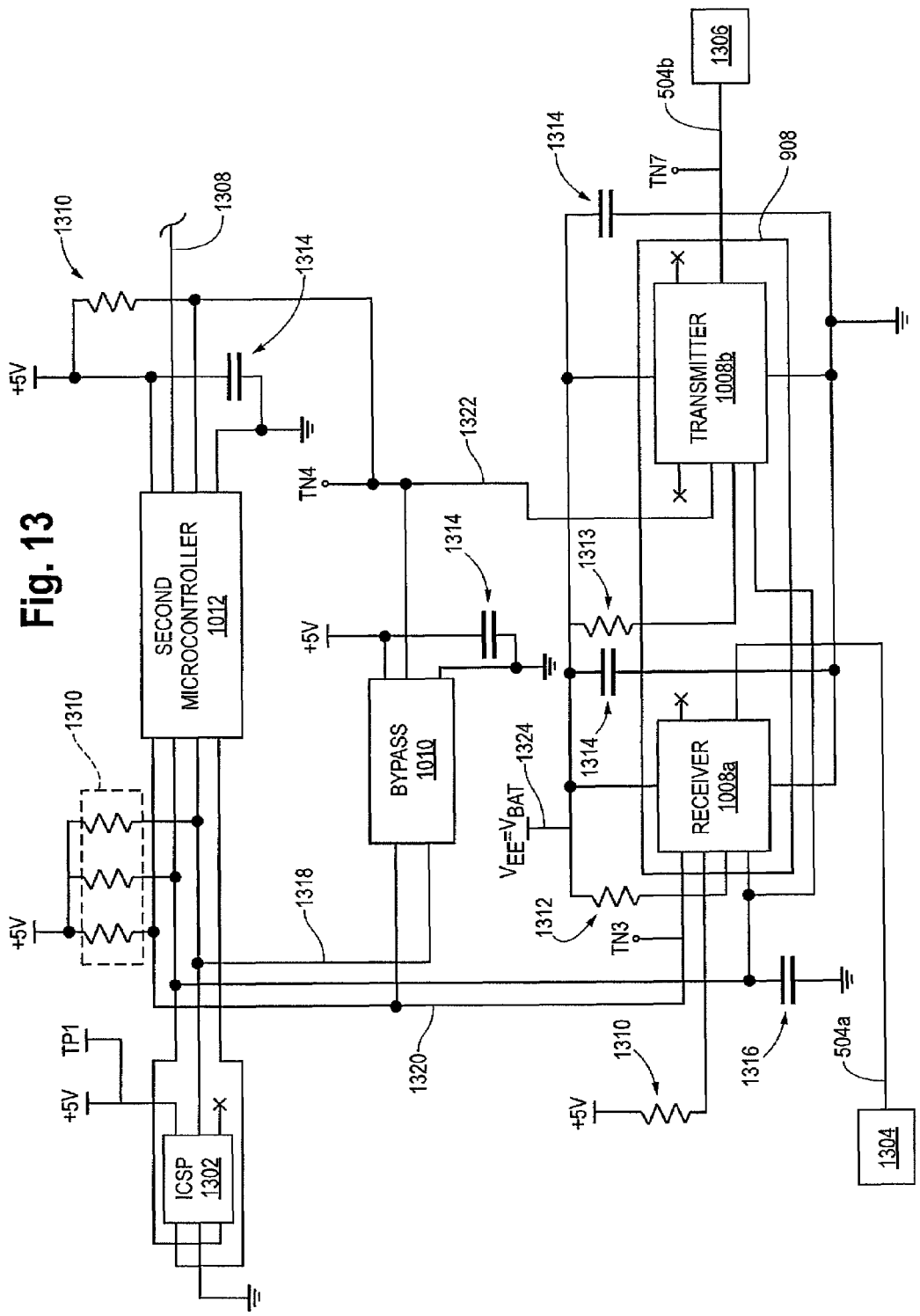
FIG. 13 is a schematic diagram of one potential embodiment of the array controller of FIGS. 3 and 10.

FIG. 13 shows an embodiment of a portion of circuit board 304 that may include serial port 1302 (e.g., a ICSP—In Circuit Serial Programming Port), microcontroller 1012, bypass 1010, transceiver 1008, incoming control access point 1304, and outgoing control access point 1306. As shown in FIG. 13, transceiver 1008 may include receiver 1008a and transmitter 1008b. Circuit board 304 may include a lamp illumination lead 1308. Providing a signal on lamp illumination lead 1308 may cause array drive 1004 to cause illuminator array 302 to light. Circuit board 304 may also include a plurality of resistors 1310, that may be 10,000 Ohm resistors; a pair of resistor 1312, that may be 4,700 Ohm resistors; a plurality of capacitors 1314, that may be 100 nano-Farad capacitors; and a capacitor 1316, that may be a 10 nano-Farad capacitor.

Figure 14:
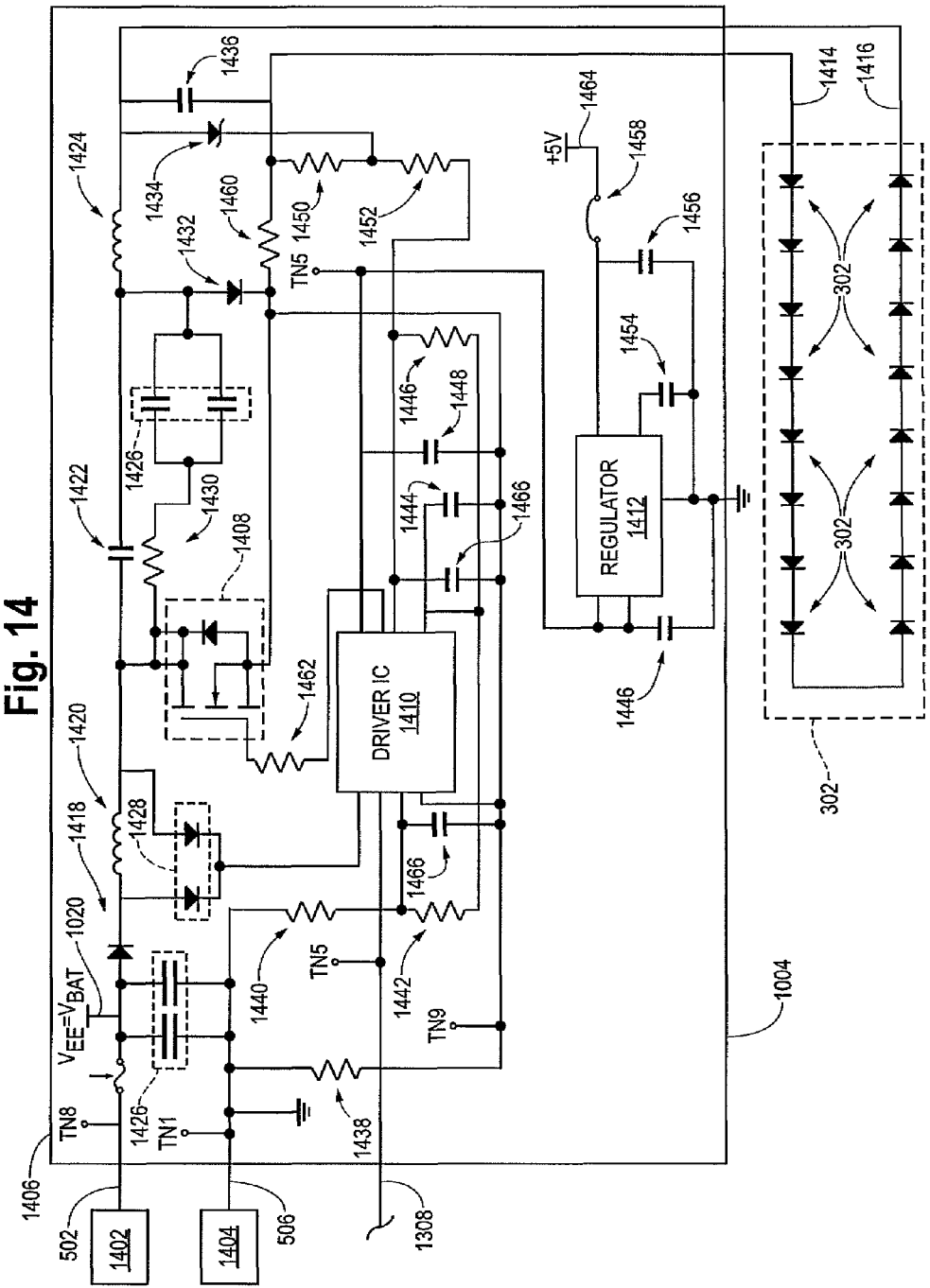
FIG. 14 is a schematic diagram of one potential embodiment of the array drive and illuminator array of FIG. 10.

The source for reference voltage $V_{EE}$ on line 1324 may be power lead 502 (see FIG. 14). The source for the 5-Volt reference power shown in FIG. 13 may be line 1464 of FIG. 14. Circuit board 304 may also include a plurality of test points ("TP*" in FIG. 13) and test nodes ("TN*" in FIG. 13).

In one embodiment, serial port 1302 may be a Molex part no. 15-91-2060; second microcontroller 1012 may be an 8-Pin flash-based, 8-Bit, CMOS microcontroller available from Microchip Technology part no. PIC12F683; bypass 1010 may be a 3-state bus buffer/line driver; from Phillips Semiconductor, part no. 74LVC1G126; and receiver 1008a and transmitter may be a pair of LIN bus transceiver from Maxim/Dallas part no. MAX13020; and connectors 1304 and 1306 may be custom pins. In other embodiments, microcontroller 1012 may be a part number PIC 12F683 available from Microchip of Austin, Tex. Alternatively, an ASIC (application-specific integrated circuit) may be used instead of the discrete components limited above.

Still referring to FIG. 13, under normal conditions, circuit board 304 may receive control input on incoming control lead 504*a* via incoming control access point 1304. Control input may originate in system controller 106 or another fixture 104. Receiver 1008*a* passes the control input on to microcontroller 1012 via lead 1320. Microcontroller 1012 may receive the control input as encoded control information that may be in a serial bit stream. Microcontroller 1012 operates illuminator array 302 according to the decoded data via lamp illuminator lead 1308. The microcontroller enables or disables the bypass allowing data to pass to the next fixture 104 in series, if any, via lead 1322, transmitter 1008*b*, outgoing control lead 504*b*, and outgoing control access point 1306.

Should microcontroller 1002 fail, bypass 1010 may recognize the failure via a loss of signal, or other indication, on lead 1318. Bypass 1010 may then directly route the received control input from lead 1320 to lead 1322, ensuring that the remainder of the fixtures connected in series, if any, continue to operate.

Referring to FIG. 13, resistors 1310 and 1313 are pull-up resistors, to terminate the signals in a high-state, or conversely to decrease the impedance of the ground state on incoming lead line 504*a* needed to create a low input at receiver 1008*a*.

FIG. 14 shows an embodiment of array drive 1004 and illuminator array 302 located on portions of circuit board 304. Array drive 1004 may include a power lead 502 access point 1402, a ground lead 506 access point 1404, and may receive lamp illumination lead 1308 from the portion of circuit board 304 illustrated in FIG. 13. Array drive 1004 may also include functional components such as a fuse 1406, a transistor 1408, driver integrated circuit 1410, and regulator 1412. Array drive 1004 may provide a positive illuminator power lead 1414 and a negative illuminator power lead 1416.

Array drive 1004 may further include standard circuit components such as diode 1418, inductor 1420, capacitor 1422, inductor 1424, capacitors 1426, diode 1428, resistor 1430, diode 1432, zener diode 1434, capacitor 1436, resistors 1438, 1440, and 1442, capacitor 1444 and 1446, resistors 1448, 1450, and 1452, capacitors 1454 and 1456, fuse 1458, resistors 1460 and 1462, and capacitors 1466. Circuit board 304 may also include a test nodes that are designated "TN*" in FIG. 14. Line 1464 provides a +5 Volt power source for circuit board 304.

In one embodiment, access points 1304 and 1306 of FIG. 13 and 1402 and 1404 of FIG. 14 may be insulation-displacement connector custom pins, or pins pushing right through the wire and letting the wire surround the pin; fuse 1406 may be a 1-amp fuse, transistor 1408 may be an N-channel enhancement mode vertical DMOS field effect transistor from Supertex Incorporated part no. TN2425N8, driver integrated circuit 1410 may be hysteretic boost-buck LED driver integrated circuit from Supertex Inc. part no. HV9930LG-G; regulator 1412 may be a 150-milli-Amp low-noise low-dropout regulator with shutdown from Texas Instruments part no. LP2985-50; diode 1418 may be an International Rectifier part no. MURS120 diode; inductor 1420 may be 680 micro-Henry inductor; capacitor 1422 may be a 200 volt 10 nano-Farad capacitor; inductor 1424 may be a 2.2 milli-Henry inductor; capacitors 1426 may be 250-volt rated 470 nano-Farad capacitors; diodes 1428 may be small signal diodes from Fairchild Semiconductor part no. BAS20; resistor 1430 may be a 78 Ohm resistor; diode 1432 may be a controller avalanche rectifier from Phillips Semiconductor part no. US1D; zener diode 1434 may be a General Semiconductor part no. BZX84C75; capacitor 1436 may be a 100-volt rated 10 nano-Farad capacitor; resistor 1438 may be a 232 Ohm resistor; resistor 1440 may be a 4220 Ohm resistor; and resistor 1442 may be a 10,000 Ohm resistor; capacitor 1444 may be a 16-volt rated 1 micro-Farad capacitor; capacitor 1446 may be a 16-volt rated 2.2 micro-Farad capacitor; resistor 1448 may be a 10,000 Ohm resistor; resistor 1450 may be a 150 Ohm resistor; resistor 1452 may be a 3320 Ohm resistor; capacitors 1454 may be a 10 nano-Farad capacitor; capacitor 1456 may be a 10 micro-Farad capacitor; a standard 1-amp fast-blow fuse 1458 may be used; resistor 1460 may be a 187 Ohm resistor; resistor 1462 may be a 10 Ohm resistor; and capacitors 1466 may be 100 pica-Farad capacitors.

In the embodiment illustrated in FIG. 14, illuminator array 302 may include a plurality of lamps 302*a* connected in series. In such an arrangement, a single array drive 1004 may be employed to operate the entire illuminator array 302. Array driver 1004 may provide a constant current source and a DC-DC converter for illuminator array 302. In the currently preferred example, the primary components of the Boost-Buck DC-DC converter are the two inductors 1420 and 1424, capacitor 1422, diode 1432 and FET 1408 controlled by driver IC 1410. Driver IC 1410 turns FET 1408 on and off using a hysteretic control to maintain the average current in inductor 1424 as sensed by voltage across resistor 1460. Diode 1418 provides reverse polarity protection, blocking any current flow. Open circuit protection is provided by Zener diode 1434 and the resistor network consisting of resistors 1450 and 1452, which clamp the output voltage at a maximum value. Protection from the load dump transients typically found in the automotive electrical system is provided by using components FET 1408, diodes 1428, capacitor 1422, diode 1432 and driver IC 1410 rated at 200 volts. In addition, the LIN receiver 1008*a* and transmitter 1008*b* provide fault protection on the receive and transmit signals of ±60 volts.

Array drive 1004 may include a constant current source that may be configured to provide a generally equivalent drive current for individual lamps 302*a* in illuminator array 302. In some embodiments, this may result in more favorable operation than employing a fixed voltage source for illuminator array 302. For example, a constant current source lamp 302*a* lumen output may remain constant over a greater voltage variance between power lead 502 and ground 506. Further, the number of lamps 302*a* in an illuminator array 302 may vary, for example, between several and possibly as few as one lamp, on the one hand, and as many as twenty or more lamps on the other, without requiring a change in the voltage between power lead 502 and ground 506, as set by the resistance value at 1460.

Array drive 1004 may also include a DC-DC converter to provide input voltage tolerance between power lead 502 and ground 506. The array drive 1004 may address typical vehicle power source problems such as but not limited to voltage transients such as voltage dumps.

Figure 15A:
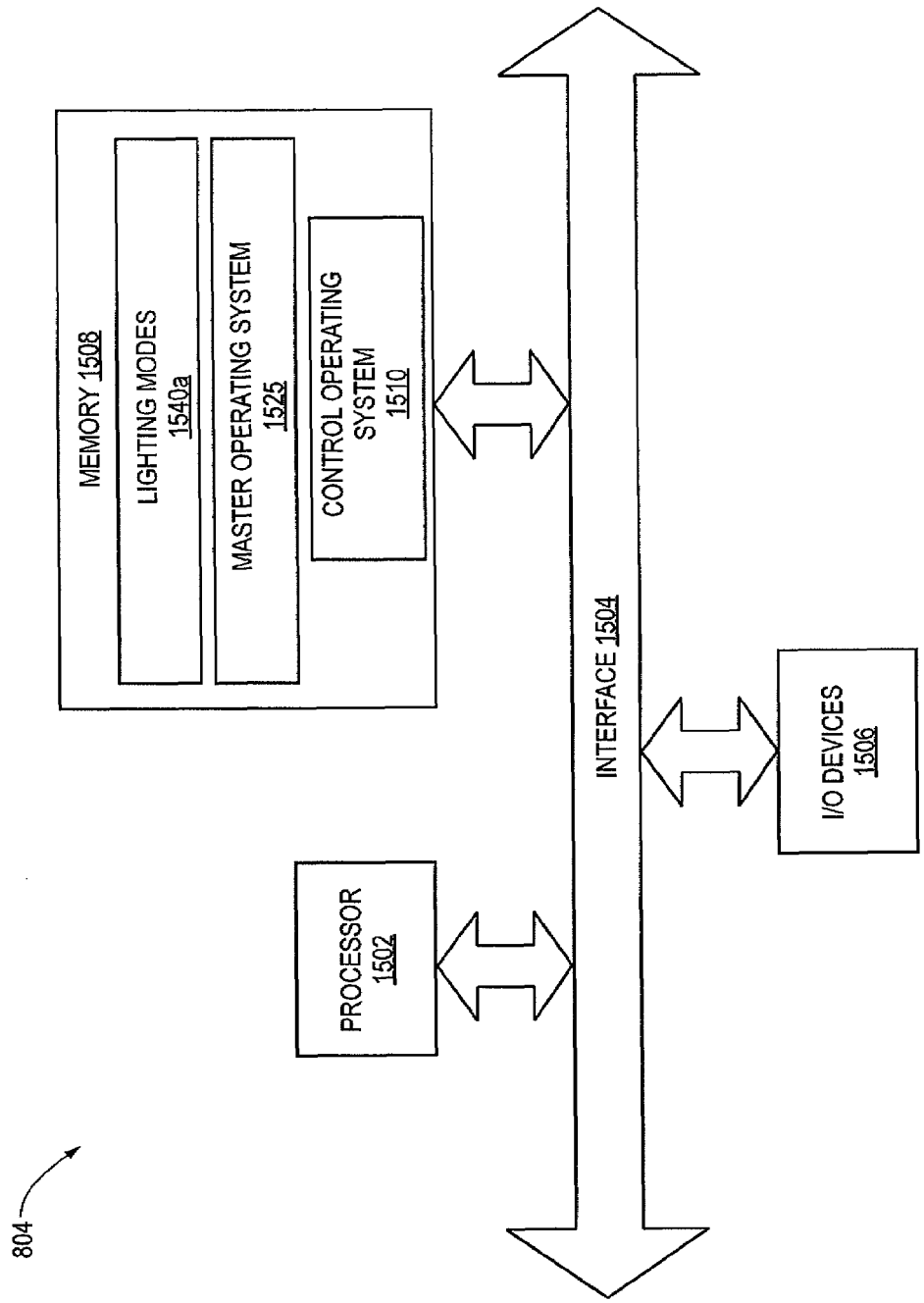
FIG. 15A is a block diagram of an embodiment of the first microcontroller of FIGS. 8 and 12, including programs that may be stored in a memory element, programs such as a master operating system.

Turning now to FIG. 15A, one embodiment of the invention is generally related to software for permitting flexible and default illumination patterns for fixtures 104 and, more particularly, is related to master operating system 1525 for allowing state-free flexible and default illumination of fixtures 104. The master operating system 1530 provides a system and method of operating system controller 106 and/or a fixture 104 operating as a master unit 902. In one embodiment illustrated in FIG. 15A, master operating system 1525 may be implemented as software in memory element 1508 of first microcontroller 804 shown in FIG. 8.

In another embodiment illustrated in FIG. 15B, master operating system 1525, and other systems, may be incorporated into a memory element 1518 of second microcontroller 1012 (shown in FIG. 13) of fixture 104. The flexible and default illumination patterns for fixtures 104 may be provided through an arbitration and clocking system 1530, the master operating system 1525, and a slave operating system 1535 for allowing state-free flexible and default illumination through arbitration and clocking routines.

In one embodiment, the systems 1525, 1530 and 1535 may be implemented as software in second microcontroller 1012. The arbitration and clocking system 1530, or a portion of the system 1530, may run in a control operating system 1520 main loop in which a series of main tasks are performed in a sequential order.

Figure 18:
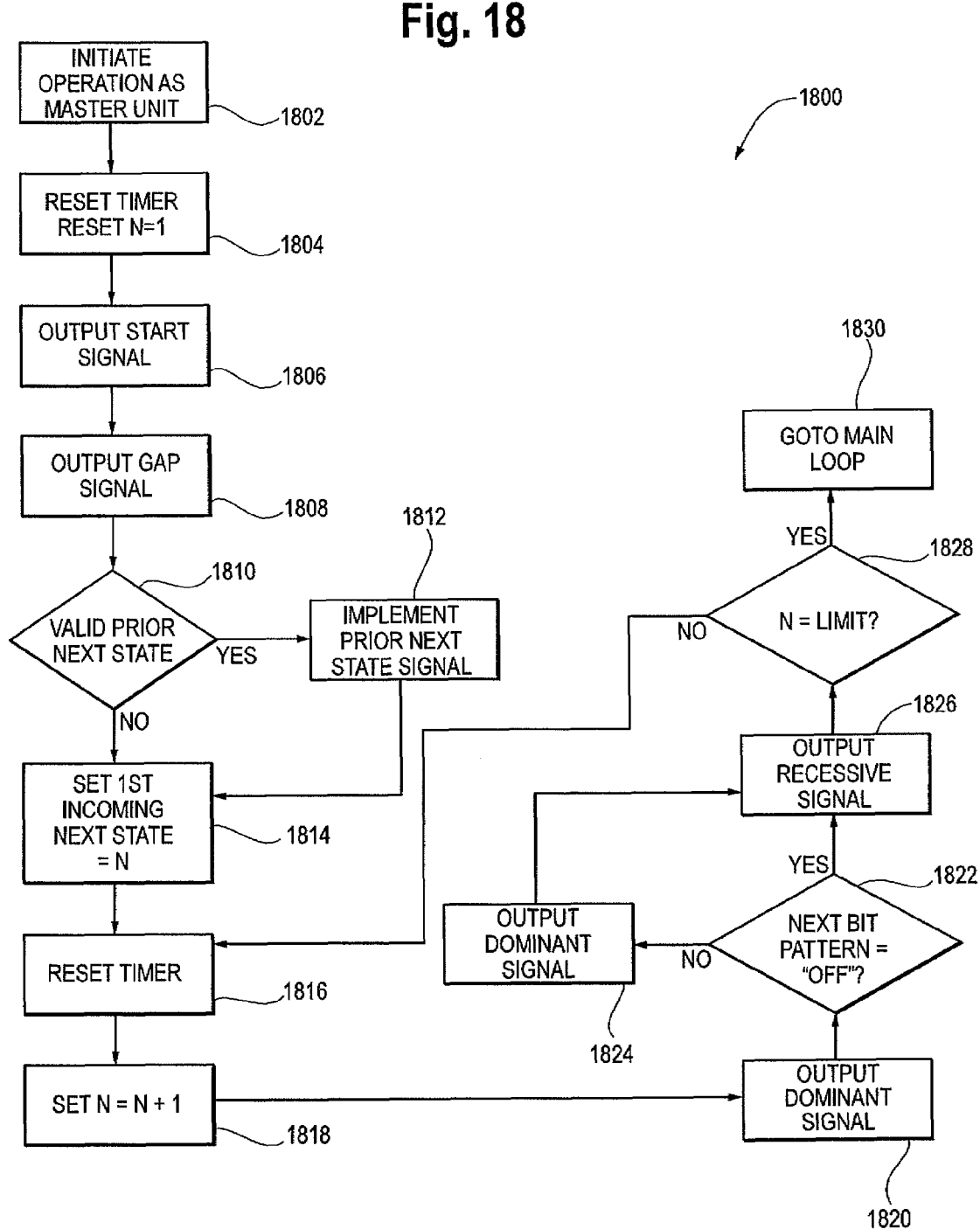
FIG. 18 is a flowchart of the master operating system of FIGS. 15A and 15B.

The arbitration and clocking system 1530 provides a system and method of determining when a fixture 104 should operate as a master unit 902 or a slave unit, e.g., slave unit 904. The master operating system 1530 and slave operating system 1535 provide a system and method of operating according to the result of, and in cooperation with, the arbitration and clocking system 1525. FIGS. 15, 17 and 18 show flowcharts that describe embodiments, respectively, of the arbitration and clocking system 1530, master operating system 1525, and slave operating system 1535.

Returning to FIG. 15A, shown is a block diagram of an embodiment of the first microcontroller 804 of FIGS. 8 and 12 (associated with system controller 106), including programs, such as a master operating system 1525, and a first table(s) of lighting modes 1540a that may be stored in a memory element 1508. FIG. 15B is a block diagram of one embodiment of second microcontroller 1012 of FIGS. 10 and 13 (associated with fixture 104), including programs that may be stored in a memory element 1518 such as the arbitration and clocking system 1530, a master operating system 1525, and a slave operating system 1535, and a second table(s) of lighting modes 1440b that may be stored in a memory element 1518.

The arbitration and clocking system 1530 may determine the unique mode of a plurality of fixtures 104 that may be incorporated into a system. In one embodiment, the arbitration and clocking system 1530 may determine the unique mode of a system having, for example, forty-eight fixtures 104. The arbitration and clocking system 1530 may provide a state-free architecture in which specific fixture 104 address data is not required.

In the embodiments illustrated in FIGS. 15A and 15B, microcontrollers 804 and 1012 may include a computer readable format embodiment of master operating system 1525. In the embodiment illustrated in FIG. 15B, in addition to master operating system 1525, microcontroller 1012 may also include a computer readable format embodiment of the arbitration and clocking system 1530 and the slave operating system 1535.

Generally, in terms of hardware architecture, microcontrollers 804 and 1012 may include a processor 1502 and 1512 respectively, memory 1508 and 1518 respectively, and one or more input and/or output (I/O) devices 1506 and 1516 respectively (or peripherals) that are communicatively coupled via a local interface 1504 and 1514 respectively. Local interface 1504 and 1514 can be, for example, one or more buses or other wired or wireless connections, as is known in the art. Local interface 1504 and 1518 may have additional elements, which are omitted for simplicity, such as controllers, buffers (caches), drivers, repeaters, and receivers, to enable communications. Further, local interface 1504 and 1514 may include address, control, and/or data connections to enable appropriate communications among the aforementioned components.

The arbitration and clocking system 1530, master operating system 1525, and slave operating system 1535 can be implemented in software (e.g., firmware), hardware, or a combination thereof. In one embodiment, the arbitration and clocking system 1530, master operating system 1525, and slave operating system 1535 are implemented in software, as an executable program, and is executed by a special or general purpose digital computer, such as a microcontroller. However, the arbitration and clocking system 1530, master operating system 1525, and slave operating system 1535 may also be executed in other computing systems, such as but not limited to, a programmable logic controller, a personal computer (PC; IBM-compatible, Apple-compatible, or otherwise), workstation, minicomputer, and a mainframe computer.

Microcontrollers 804 and 1012 may include control operating system 1510 and 1520 in memory elements 1508 and 1518, respectively. In one embodiment, the arbitration and clocking system 1530 is incorporated into control operating system 1520 as illustrated in FIG. 15B. Though FIG. 15B shows the arbitration and clocking system 1530 as a portion of the control operating system 1520, the arbitration and clocking system 1530 may also be considered a discrete program that works in conjunction with any operating system.

Processor 1502 and 1512 may be a hardware device for executing software, particularly software stored in memory 1508 and 1518. Processor 1502 and 1512 can be any custom made or commercially available processor, a central processing unit (CPU), an auxiliary processor among several processors associated with microcontrollers 804 and 1012, a semiconductor based microprocessor (in the form of a microchip or chip set), a macroprocessor, or generally any device for executing software instructions. Suitable commercially available microprocessors include: CMOS microcontroller available from Microchip Technology part no. PIC12F683; STMicroelectronics ST microprocessors PA-RISC series microprocessors from Hewlett-Packard Company; 80x86 or Pentium series microprocessors from Intel Corporation; PowerPC microprocessors from IBM; Sparc microprocessors from Sun Microsystems, Inc.; and 68xxx series microprocessors from Motorola Corporation. DSPs (digital signal processors) from Texas Instruments, Analog Devices or other manufacturers may also be used.

In one preferred embodiment, microcontroller 804 and 1012 may be a relatively inexpensive 8-bit microcontroller such as the Microchip Technology part no. PIC12F683. Microcontroller 804 and 1012 may include a "watch dog" timer configured to reset processor 1502 and 1512 in the event an error such as an endless loop occurs in microcontroller 804 and/or 1012. Such intermittent failures may be corrected based on the communication protocol in which a serial bit stream is periodically repeated where the time between repeating bit streams is greater than the time required to transmit the bit stream. For example, a serial bit stream requiring 120 milliseconds may be repeated every 150 milliseconds.

Memory 1508 and 1518 may include one or more memory elements such as volatile memory elements (e.g., random access memory (RAM, such as DRAM, SRAM, SDRAM, etc.)) and nonvolatile memory elements (e.g., ROM, hard drive, tape, CDROM, etc.). Memory 1508 and 1518 may also incorporate electronic, magnetic, optical, and/or other types of storage media. Memory 1508 and 1518 may have a distributed architecture, where various components are situated remote from one another, but can be accessed by the processor 1502 and 1512, respectively.

The software in memory 1508 and 1518 may include one or more separate programs, each of which comprises an ordered listing of executable instructions for implementing logical functions. In the examples of FIGS. 15A and 15B, the software in memory 1508 and 1518 includes a control operating system 1510 and 1520, respectively. Control operating system 1520 may include the arbitration and clocking system 1530.

Control operating system 1510 and 1520 may also include portions of commercially available operating systems such as: (a) CCS Real Time Operating System (RTOS); (b) a Windows operating system available from Microsoft Corporation; (c) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (f) a LINUX operating system, which is freeware that is readily available on the Internet; (g) a run time Vxworks operating system from WindRiver Systems, Inc.; or (h) an appliance-based operating system, such as that implemented in handheld computers or personal data assistants (PDAs) (e.g., PalmOS available from Palm Computing, Inc., and Windows CE available from Microsoft Corporation). The control operating system 1510 and 1520 essentially controls the execution of other computer programs and provides scheduling, input-output control, file and data management, memory management, and communication control and related services.

The arbitration and clocking system 1530, master operating system 1525, and slave operating system 1535 may be source programs, executable programs (object code), scripts, or any other entity comprising a set of instructions to be performed. When the systems 1530, 1525 and 1535 are source programs, they may be translated via a compiler, assembler, interpreter, or the like. The translator may, or may not, be included within memory 1508 and 1518, so as to operate properly with the control operating system 1510 and 1520, respectively. Furthermore, the systems 1525, 1530, and 1535 can be written as (a) an object oriented programming language, which has classes of data and methods, or (b) a procedure programming language, which has routines, subroutines, and/or functions, for example PICBASIC, C, C++, Pascal, Basic, Fortran, Cobol, Perl, Java, and Ada. In one currently contemplated mode of practicing the invention, systems 1525, 1530, and 1535 are written in C.

The I/O devices 1506 and 1516 may include input devices, for example, digital input modules, contacts, general purpose pins, etc. Furthermore, the I/O devices 1506 and 1516 may also include output devices, for example digital output modules, clocks, general purpose pins, etc. Finally, the I/O devices 1506 and 1516 may further include devices that communicate both inputs and outputs, for instance a modulator/demodulator (modem; for accessing another device, system, or network), a radio frequency (RF) or other transceiver, a telephonic interface, a bridge, a router, and network connections, etc.

The software in memory 1508 and 1518 may further include a basic input output system (BIOS) (omitted for simplicity). The BIOS is a set of essential software routines that initialize and test hardware at startup, start the control operating systems 1510 and 1520, and support the transfer of data among the hardware devices. The BIOS may be stored in ROM so that the BIOS can be executed when microcomputers 804 and 1012 are activated.

When the arbitration and clocking system 1530, master operating system 1525, and slave operating system 1535 are in operation, processor 1502 and/or 1512 are configured to execute software stored within memory 1508 and 1518, to communicate data to and from the memory 1508 and 1518, and to generally control operations of the microcomputers 804 and 1012 pursuant to the software. The arbitration and clocking system 1530, master operating system 1525, slave operating system 1535, and the control operating system 1510, in whole or in part, but typically the latter, are read by the processor 1502 and 1512, perhaps buffered within the processor 1502 and 1512, and then executed.

When the arbitration and clocking system 1530, master operating system 1525, and slave operating system 1535 are implemented in software, as is shown in FIGS. 15A and 15B, it should be noted that the systems 1525, 1530, and 1535 can be stored on any computer readable medium for use by or in connection with any computer related system or method. In the context of this document, a computer readable medium is an electronic, magnetic, optical, or other physical device or means that can contain or store a computer program for use by, or in connection with, a computer related system or method. The systems 1525, 1530, and 1535 can be embodied in any computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the systems 1525, 1530, and 1535 are implemented in hardware, the systems 1525, 1530, and 1535 can be implemented with any, or a combination of, the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIG. 16 shows a flowchart 1600 illustrating one embodiment of the arbitration and clocking system 1530 of FIG. 15B in which at least portions of the arbitration and clocking system 1530 may be incorporated into the control operating system 1520 of first microcontroller 804 and/or second microcontroller 1002 through a computer readable medium.

Figure 19:
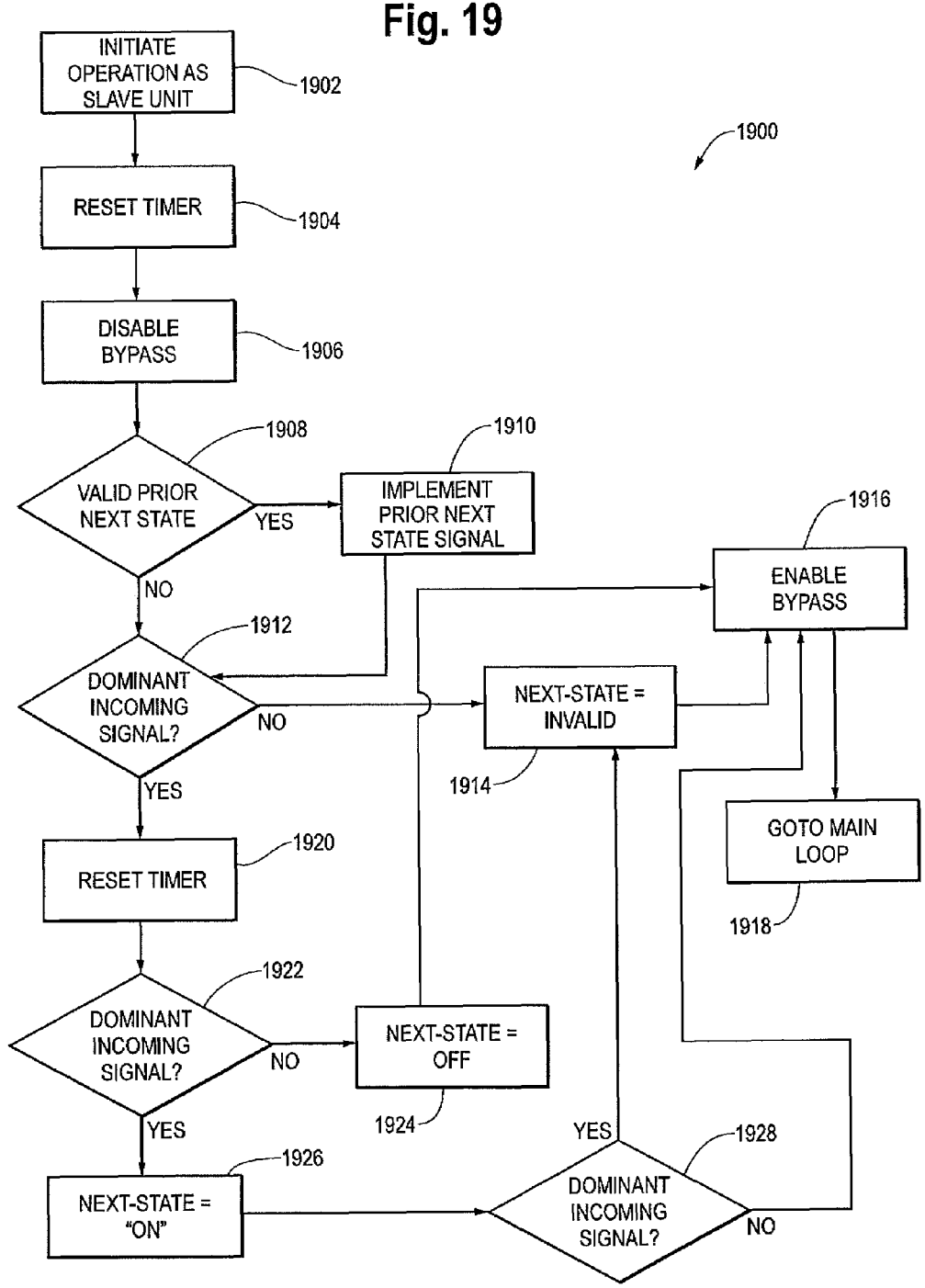
FIG. 19 is a flowchart of the slave operating system of FIG. 16B.

Flowchart 1600, 1800, and 1900 of FIGS. 16, 18 and 19, respectively, show the architecture, functionality, and operation of possible implementations of the arbitration and clocking system 1530, master operating system 1525, and slave operating system 1534, respectively. The blocks represent modules, segments, and/or portions of code. The modules, segments, and/or portions of code include one or more executable instructions for implementing the specified logical function(s). In some implementations, the functions noted in the blocks may occur in a different order than that shown in FIGS. 16, 17 and 18. For example, two blocks shown in succession in FIG. 16 may be executed concurrently, or the blocks may sometimes be executed in another order, depending upon the functionality involved.

Control operating system 1520 may include a main loop that includes block 1602 that triggers the arbitration and clocking system 1530. After block 1602, system 1530 may cause travel to block 1604. In block 1604, a timer may be initiated within microcomputer 1012. After block 1604, system 1530 causes movement to block 1606.

In block 1606, the arbitration and clocking system 1530 may determine whether an incoming signal, for example a signal on incoming control lead 504a, is floating or recessive (an incoming recessive signal may be, e.g., 0.6 Vbat through Vbat, pursuant to the LIN protocol described above). If floating or recessive, the arbitration and clocking system 1530 moves to block 1608. If not floating or recessive, the arbitration and clocking system 1530 moves to block 1610.

Referring now to FIGS. 15B and 16, the arbitration and clocking system 1530 of FIG. 15B determines whether the input signal remains floating or recessive for a period of time, for example two seconds. If the input signal does not remain floating or recessive for the period of time considered in block 1608 of FIG. 16, the logic of FIG. 16 may dictate a return to block 1604, reinitiating the timer. If the input signal does remain floating or recessive for the period of time considered in block 1608, system 1530 causes movement to block 1612. In block 1612, system 1530 may cause an illuminator array, for example array 302, to be lit, for example by providing an appropriate signal on lead 1308. After block 1612, system 1530 causes a return to block 1604 and reinitiates the timer.

Blocks 1606, 1608, and 1612 thus provide a means for operating fixture 104 in a manner similar to a standard lamp in which the lamps are kept on when the signal on incoming line 504a remains high, or recessive.

Returning to block 1610, the system 1530 may look for a dominant input signal, for example on incoming control lead 504a (e.g., a voltage level of ground through 0.4 Vbat, pursuant to the LIN protocol described above). If no dominant input signal is found, the system returns to block 1604 and reinitiates the timer. If a dominant input signal is found and sustained for a period of time in block 1610, the system may go to block 1614. For example, if the system 1530 finds a dominant incoming signal is sustained for 0-5 milliseconds after the initiation of the timer in block 1604, the system may go to block 6514.

In block 1614, the system 1530 determines whether a recessive signal is then received on incoming control lead 504a within a period of time, for example between 5 and 15 milliseconds after the initiation of the timer in block 1604. If a recessive incoming signal is received in the time period considered in block 1614, the system 1530 may go to block 1616. In block 1616, the fixture 104 may be configured to operate as a slave unit, such as slave units 904, 906, etc. FIG. 19 shows an embodiment of a system and method for operating as a slave unit.

If a recessive incoming control signal is not received in the time period considered in block 1614, the system 1530 may go to block 1618. In block 1618, a bypass, for example bypass 1010, may be disabled. Disabling the bypass in block 1618 may result in a recessive signal being provided to subsequent fixtures in the series via outgoing control lead 504b. In this embodiment, if the microcontroller does not stop the bypass, the bypass circuit passes the input signal to the output.

After block 1618, the system 1630 may go to block 1620 where the system 1530 may determine whether the input signal remains dominant for a further period of time, for example between 15 and 30 milliseconds after the initiation of the timer in block 1604. If the input signal does not remain dominant for the period of time considered in block 1620, the system 1530 may go to block 1622. In block 1622, the system 1530 may enable the bypass, for example bypass 1010, and the system 1530 may then return to block 1604 to reinitiate the timer.

Returning to block 1620 of system 1530, if the incoming signal remains dominants for the period of time considered in block 1620, the system 1530 may go to block 1624. In block 1624, the fixture 104 may become a master unit, for example master unit 902.

In flowchart 1600, a persistent recessive incoming signal, for example on incoming control lead 504a, may result in the illuminator array 302 turning on in block 1612; while a persistent dominant signal may result in fixture 104 becoming a master unit in block 1624, with the bypass having been disabled in block 1618 resulting in subsequent fixtures receiving a recessive control input while system 1530 operates. An initial recessive incoming signal, followed by a dominant signal, followed by a recessive signal, may result in the fixture 104 becoming a slave in block 1616. In the preferred example, the LIN receiver has thresholds with hysteresis, so if a signal is static, or is hunting in the range between a dominant and recessive signal, the signal would need to cross the thresholds to change mode.

In one embodiment, arbitration and clocking system 1530 may include a state-free protocol. A state-free protocol may avoid problems associated with loss of synchronization when one fixture 104 in a series of fixtures 104 malfunctions. Such synchronization issues may be associated with prior art address schemes. In such state free embodiments, the initialization of a plurality of fixtures 104 may not be required. Further, fixtures 104 may be added, or restored, to the plurality of fixtures 104 in a manner that allows prompt resumption of coordinated operation. Further, an address free arbitration and clocking system 1530 may eliminate any communication scheme limits on the number of fixtures 104 that may be operated in a coordinated manner.

In one embodiment, arbitration and clocking system 1530 may employ a flexible timing scheme. In another embodiment, arbitration and clocking system 1530 may include features such as, but not limited to a relatively low data rate, a simple data pattern, and a robust timing scheme to provide a generally reliable performance in vehicle applications that may include relatively high electrical noise. Fixtures 104 may also include filtering and protection circuits, such as but not limited to those shown in FIGS. 11-14, for the components within fixture 104.

In one embodiment, arbitration and clocking system 1530 includes predefined fixture operation modes, for examples lighting modes 1540b stored in memory 1518, that the arbitration and clocking system 1530 may default to in the event incoming communication, for example on incoming control lead 504a, is lost. Similarly, the arbitration and clocking system 1530 may default to predefined fixture operation schemes when a simple input pattern is received, for example on incoming control lead 504a. Such simple input patterns may include, but are not limited to, incoming control lead 504a equivalent to power lead 502, a floating incoming control lead 504a, and a grounded incoming control lead 504a.

In another embodiment, arbitration and clocking system 1530 may allow for any fixture 104 in a plurality of fixtures 104 to become a master, i.e., enabled to control other fixtures 104. The arbitration and clocking system 1530 may allow a fixture 104 to become a master when incoming control lead 504a shows a simple input pattern and/or when a signal on incoming control lead 504a is lost.

In another embodiment, arbitration and clocking system 1530 may allow for a plurality of illumination patterns in a plurality of fixtures 104. In some embodiments, the illumination patterns, when transmitted by a controller, are not required to be pre-programmed. The arbitration and clocking system 1530 may allow illumination patterns in which maximum change rates are only dependent upon the timing scheme of the communication protocol, and the timing scheme may vary.

FIG. 17 shows an embodiment of a serial communication bit stream protocol 1700 for transferring data to fixture 104, and/or to a series of fixtures 104. Lighting modes, for example lighting modes 1540a and 1540b, may be stored and/or selected in a fixture 104 acting as a master unit 902, and/or stored and/or selected in a system controller 106. In other embodiments, lighting modes may be input to system controller 106.

The lighting modes 1540a and 1540b may be communicated via the serial communication bit stream 1700. In the embodiment of the serial bit stream illustrated in FIG. 17, the bit stream 1700 may include a dominant start signal 1702, followed by a gap 1704, followed by a series of self-clocking next-state pulses 1706, for example 47 or 48 self-clocking next-state pulses 1706.

The next-state pulses 1706 may be used to communicate the desired operation of the fixtures 104 in a series of fixtures 104. In one preferred embodiment, the start signal may be a dominant 10 millisecond signal, gap 1704 may be a ten millisecond recessive signal, and the plurality of next-state pulses 1706 may include one or more two millisecond next-state "on" pulses 1706a, interspersed with a one or more two millisecond next-state "off" pulses 1706b. For example, "on" pulses 1706a may include a 1.5 millisecond dominant pulse and a 0.5 millisecond recessive pulse; while the "off" pulses 1706b may include a 0.5 millisecond dominant pulse followed by a 1.5 millisecond recessive pulse.

In the preferred embodiment, the serial bit stream 1700 may be sent in 120 milliseconds and may be repeated every 150 milliseconds. The preferred embodiment thus leaves time for correction of transmission errors. (Errors are corrected with the next repeat, or changed to the next state, so they would only exist for about 120-150 ms.) In the preferred embodiment, the start signal 1702 may be used to synchronize data transfer and to initiate the operation of a fixture 104 based on previously received operating instructions from a previously transmitted serial bit stream.

The operation of the bypass circuits 1010 of fixtures 104 in a series of fixtures 104 acting in accordance with the arbitration and clocking system 1535 may result in the leading edge of a start signal, such as start signal 1702, appearing at each fixture 104 in a series simultaneously.

FIG. 18 shows a flowchart 1800 illustrating one embodiment of the master operating system 1525. In one embodiment, lighting modes 1540a and 1540b may be a series of bits residing in memory 1508 and/or 1518, and master operating system 1525 is incorporated into memory 1508 and/or 1518 of microcontrollers 804 and/or 1012 through a computer readable medium.

The master operating system 1525 may be initiated in block 1802. In one embodiment, block 1802 may follow block 1624 (FIG. 16) of the arbitration and clocking system 1530 (FIG. 15) when a fixture 104 is operating as a master unit, such as master unit 902. After block 1802, the master operating system 1525 may go to block 1804.

In block 1804, the master operating system 1525 may reset a timer, which may or may not be the same as the timer of block 1604, and resets an arbitrary integer N=1. After block 1804, system 1525 may go to block 1806. In block 1806, the system 1525 may provide a start signal, for example by causing a dominant signal output on outgoing control lead 504b for a period of time, for example for 10 milliseconds following the resetting of the timer in block 1804. After block 1806, the system 1525 may go to block 1808.

In block 1808, the master operating system 1525 may provide a gap signal, for example by causing a recessive output on outgoing control lead 504b for a period of time, for example from 10 to 20 milliseconds after the resetting of the timer in block 1804. After block 1808, the system 1525 may go to block 1810.

In block 1810, the master operating system 1525 refers to a pattern buffer (lighting modes 1540b of FIG. 15B) to determine whether a previously received bit stream included a next-state signal that was relevant and valid to the operation of the fixture 104. For example, the system 1525 may determine in block 1810 whether the bits applicable to the fixture 104 immediately following the gap signal in a previously received serial bit stream are in the form of a valid next-state signal. A valid next state signal may be in the forms described previously regarding next-state "on" pulses 1706a and next-state "off" pulses 1706b. If the system 1525 determines a valid start and gap signal was received, the system 1525 may move to block 1812.

In block 1812, the master operating system 1525 may operate any illuminator array associated with the fixture 104 in which the system 1525 resides according to the next-state signal. For example, in the embodiment where system 1525 is incorporated into memory 1508 of a fixture 104 operating as a master unit 902, in block 1812 microcontroller 1012 may cause a signal output on lead 1308 (FIG. 13) to light, or not light, illuminator array 302 according to the form of the next-state signal provided in a preceding serial bit stream. After block 1812, the system 1525 may go to block 1814.

If in block 1810 the master operating system 1525 refers to lighting modes 1540b of FIG. 15B to determine the bit stream following the gap signal is not a valid next-state signal, the system 1525 may move to block 1814. In block 1814, the system 1525 may designate the bit stream following the gap signal in the current serial bit stream as the bit pattern N, where N is initially as set in block 1804. After block 1814, the system 1525 may go to block 1816.

In block 1816, the master operating system 1525 may restart the timer of block 1804. After block 1816, the system 1525 may go to block 1818. In block 1818, the system may increase N by 1. After block 1818, the system 1525 may go to block 1820. In block 1820, the system 1525 may cause a dominant signal to be output, for example on outgoing control lead 504b, for a period of time, for example 0.5 milliseconds after the re-initiation of the timer in block 1816. After block 1820, the system 1525 may go to block 1822.

In block 1822, the master operating system 1525 may determine whether the next bit pattern in the lighting sequence represents a next-state "on" signal, or a next-state "off" signal. If the lighting sequence represents an "off" signal, the system 1525 may go to block 1826 from block 1822. If the lighting sequence represents an "on" signal, the system 1525 may go to block 1824. In block 1824, the system 1525 may send a dominant signal, for example on outgoing control lead 504b, until a specific time is reached, for example for 1.5 milliseconds. After block 1824, the system may go to block 1826.

In block 1826, the master operating system 1525 may send a recessive signal for a period of time. For example system 1525 may cause a recessive signal on outgoing control lead 504b until the timer initiated in block 1816 reaches 2 milliseconds. After block 1826, the system 1525 may go to block 1828. In block 1828, the system 1525 may determine whether the "N" integer is equal to a preset limit, for example 47. If "N" is not equal to the preset limit in block 1828, the system 1525 may return to block 1816. If "N" is equal to the preset limit in block 1828, the system 1525 may go to block 1830. In block 1830, the system 1525 may return to the main loop. For example, the system may return to the main loop of the control operating system of microcontroller 804 and/or 1012.

In the embodiment in which the master operating system 1525 is employed in first microcontroller 804, an undesired dead time may result if the number of fixtures in a series of fixtures 104 is less than the number of next-state signals in the serial bit stream. The dead time may take the form of a period of time in which no illuminator array 302 is lit in a series of fixtures 104. In a preferred embodiment, the system controller 106 may be configured to limit the number of next-state signals in the serial bit stream to the number of fixtures N in a series of fixtures 104. Referring to FIG. 8, this may be accomplished using input devices (e.g., jumpers, a dip switch, etc.), by setting N less than or equal to the number of fixtures with the dip switch settings.

FIG. 19 shows a flowchart 1900 illustrating one embodiment of slave operating system 1535. In one embodiment, the slave operating system 1535 is incorporated into the memory 1508 of second microcontroller 1002 of fixture 104 through a computer readable medium.

Block 1902 may follow block 1616 (FIG. 16) of the arbitration and clocking system 1530 upon the receipt of a valid start signal. For example, system 1535 may be initiated in a fixture 104, after being set as a slave unit in block 1516 of flowchart 1600, upon the receipt of a start signal on incoming control lead 504*a*. After block 1902, the slave operating system 1535 may go to block 1904. In block 1904, the system 1535 may restart a timer, which may or may not be the same as the timer of blocks 1604 and 1804.

After block 1904, slave operating system 1535 may go to block 1906. In block 1906, system 1530 disables a bypass. For example, in block 1906 system 1535 may disable bypass 1010. After block 1906, the system 1535 may go to block 1908.

In block 1908, the slave operating system 1535 may determine whether a previously received serial bit pattern included a valid next-state signal for the fixture 104. If the system 1535 determines in block 1908 that the previously received serial bit pattern did included a valid next-state signal, the system 1535 may go to block 1910. In block 1910, the system 1535 may operate the illuminator array 302 according to the previously received next-state signal. For example, in block 1910 a signal may be provided on lead 1308 to cause the fixture to operate its illuminator array 302 based on the previously received next-state signal. After block 1910, system 1535 may go to block 1912.

If the system 1535 determines in block 1908 that no valid next-state signal was previously received, for example if the bit stream currently being processed is the first transmitted bit stream, the system 1535 may go to block 1912 from block 1908. In block 1912, the system 1535 may determine whether a dominant incoming signal is present in the current serial bit stream, for example on incoming control lead 504*a*, during a period of time, for example during the 125 milliseconds after the initiation of the timer in block 1904. If no dominant signal appears for the period of time considered in block 1914, the system 1535 may go to block 1914. In block 1914, the system 1535 may set the next-state as invalid and go to block 1916. If a dominant incoming control signal in block 1912 in the time period considered in block 1912, the system 1535 may go to block 1920.

In block 1916, the slave operating system 1535 may enable the bypass, for example bypass 1010. After block 1916, the system 1535 may go to block 1918. In block 1918, the system 1535 may return to the main loop. For example, the system 1535 may return to the main loop of the control operating system of microcontroller 804 and/or 1012.

Returning to block 1920, the slave operating system 1535 may reset the timer of block 1904 and wait until the timer reaches a point, for example until timer reaches 1 millisecond after being initiated. After the period of time considered in block 1916, the system 1535 may go to block 1922. In block 1922, the system 1535 may determine if the dominant incoming signal remains. If the dominant signal does not remain on the input in block 1922, the system 1535 may go to block 1924. In block 1924, the system 1535 may set the next-state signal for fixture 104 to "OFF". After block 1922, the system 1535 may go to block 1916.

Returning to block 1922, the slave operating system 1535, if the dominant incoming control signal remains, system 1535 may go to block 1926. In block 1926, the system 1535 may set the next-state signal for fixture 104 to "ON". After block 1926, the system 1535 may go to block 1928.

In block 1928, the system 1535 may determine whether the incoming control signal is dominant a set time, for example when the timer reaches 2 milliseconds. If the incoming control signal is dominant when the timer reaches the set time, the system 1535 may go to block 1914 where the next-state is set as invalid. If the incoming control signal returns to recessive before the set time, for example before 2 milliseconds, the system may go to block 1916. For example, if after 2 milliseconds the signal on incoming control lead 504*a* remains dominant, the next-state signal may be set as invalid.

The above description is not intended to limit the meaning of the words used in the following claims that define the invention. For example, while several possible designs have been described above, persons of ordinary skill in the art will understand that a variety of other designs still falling within the scope of the following claims may be envisioned and used. It is contemplated that these or other future modifications in structure, function or result will exist that are not substantial changes and that all such insubstantial changes in what is claimed are intended to be covered by the claims.

The terms used in the claims are intended to have their broadest meaning consistent with the requirements of law. Where alternative meanings are possible, the broadest meaning is intended. All terms used in the claims not specifically otherwise defined above, or not carrying a clear special meaning to those of ordinary skill in the art, are intended to be used in the normal, customary usage of grammar and the English language.

We claim:

1. A light assembly, comprising:
    a series of light fixtures in electrical communication with each other, each light fixture having at least one microcontroller controlling operation of at least one lamp and a bypass circuit connected in serial with the microcontroller, the light assembly having at least one operating mode in which an operating status of the at least one lamp is controlled by an operating status control signal, and the bypass circuit being operative to be enabled and disabled by the microcontroller allowing some or all of the control signal to be blocked or passed to a next light fixture.

2. A light assembly, comprising:
    a series of light fixtures in electrical communication with each other, each light fixture having at least one microcontroller controlling operation of at least one lamp, wherein the light assembly has at least one operating mode in which an operating status of the at least one lamp is controlled by an operating status control signal, and a bypass circuit connected in serial with the microcontroller, the bypass circuit being operative to be enabled and disabled by the microcontroller allowing some or all of the control signal to be blocked or passed to a next light fixture, wherein the bypass circuit is used by the microcontroller to determine an operating status of the at least one lamp independent of a predetermined address for the light fixture.

3. The light assembly of claim 2, wherein a light fixture is provided with an address based on a location of the light fixture within the series, without first referencing any predetermined addresses for the light fixtures within the light assembly.

4. The light assembly of claim 2, wherein the operating status control signal defines the "ON" or "OFF" state of the at least one lamp in one light fixture of the series of light fixtures until changed by a subsequent operating status control signal.

5. The light assembly of claim 2, wherein the operating status control signal defines a brightness of the at least one lamp one light fixture of the series of light fixtures until changed by a subsequent operating status control signal.

6. The light assembly of claim 2, wherein the operating status control signal defines a color of the at least one lamp in one light fixture of the series of light fixtures until changed by a subsequent operating status control signal.

7. The light assembly of claim 2, wherein the light fixtures function as lights other than as used as marker or emergency lights.

8. A light assembly, comprising:
a series of light fixtures in electrical communication with each other, each light fixture having at least one microcontroller controlling operation of at least one lamp, wherein the light assembly has at least one operating mode in which an operating status of the at least one lamp is controlled by an operating status control signal, and a bypass circuit connected in serial with the microcontroller, the bypass circuit being operative to be enabled and disabled by the microcontroller allowing some or all of the control signal to be blocked or passed to the next fixture, wherein the bypass circuit passes an operating status signal to successive light fixtures in the event of a failure or error without microprocessor control.

9. The light assembly of claim 8, wherein a light fixture is provided with an address based on a location of the light fixture within the series, without first referencing any predetermined addresses for the light fixtures within the light assembly.

10. The light assembly of claim 8, wherein the operating status control signal defines the "ON" or "OFF" state of the at least one lamp in one light fixture of the series of light fixtures until changed by a subsequent operating status control signal.

11. The light assembly of claim 8, wherein the operating status control signal defines a brightness of the at least one lamp one light fixture of the series of light fixtures until changed by a subsequent operating status control signal.

12. The light assembly of claim 8, wherein the operating status control signal defines a color of the at least one lamp in one light fixture of the series of light fixtures until changed by a subsequent operating status control signal.

13. The light assembly of claim 8, wherein the light fixtures function as lights other than as used as marker or emergency lights.

14. A light assembly, comprising:
a series of light fixtures in electrical communication with each other, each light fixture having at least one microcontroller controlling operation of at least one lamp, wherein the light assembly has at least one operating mode in which an operating status of the at least one lamp is controlled by an operating status control signal, and a bypass circuit connected in serial with the microcontroller, the bypass circuit being operative to be enabled and disabled by the microcontroller allowing some or all of the control signal to be blocked or passed to the next fixture, wherein the operating status of the at least one lamp in the light fixture is controlled by the operating status control signal based on a location of the light fixture in the series without reference to an address of the light fixture within the light assembly.

15. The light assembly of claim 14, wherein operation of the at least one lamp is driven by a constant current source providing constant lamp output independent of voltage.

16. The light assembly of claim 15, wherein the at least one lamp have constant output for input voltages varying from 8 to 32 volts.

17. The light assembly of claim 14, wherein one or more of the at least one lamp in the series comprise single color LEDs.

18. The light assembly of claim 14, wherein one or more of the at least one lamp in the series comprise multi-color LEDs.

19. The light assembly of claim 14, wherein one or more of the at least one lamp in the series are not LEDs.

20. The light assembly of claim 14, wherein at least some of the light fixtures include at least one or more lens that incorporate optical features for light distribution.

21. The light assembly of claim 20, wherein the at least one or more lens incorporate a refractive apparatus for changing the angle of light emitted by the at least one lamp.

22. The light assembly of claim 21, wherein the refractive apparatus provides visibility at 45-degrees left and right from straight-on.

23. The light assembly of claim 20, wherein the at least one lens incorporate retro-reflectors configured to allow exterior light to be reflected from the lens back in the direction of the exterior light.

24. The light assembly of claim 20, wherein the at least one or more lens are colored to match the lamp wavelength emitted by at least one or more of the at least one lamp.

25. The light assembly of claim 14, wherein a light fixture is provided with an address based on a location of the light fixture within the series, without first referencing any predetermined addresses for the light fixtures within the light assembly.

26. The light assembly of claim 14, wherein the operating status control signal defines the "ON" or "OFF" state of the at least one lamp in one light fixture of the series of light fixtures until changed by a subsequent operating status control signal.

27. The light assembly of claim 14, wherein the operating status control signal defines a brightness of the at least one lamp one light fixture of the series of light fixtures until changed by a subsequent operating status control signal.

28. The light assembly of claim 14, wherein the operating status control signal defines a color of the at least one lamp in one light fixture of the series of light fixtures until changed by a subsequent operating status control signal.

29. The light assembly of claim 14, wherein the light fixtures function as lights other than as used as marker or emergency lights.

30. A light assembly, comprising:
a series of light fixtures in electrical communication with each other, each of the light fixtures having at least one microcontroller controlling operation of at least one lamp, wherein the light assembly has at least one operating mode in which the operating status of the at least one lamp is controlled by an operating status control signal having dominant and recessive signal levels, and a bypass circuit that is operative to be enabled and disabled in reference to a static condition of a fixture of the light assembly.

31. The light assembly of claim 30, wherein the dominant signal comprises a voltage between ground and a first fraction of a power source voltage, and the recessive signal comprises a voltage between ground and a second fraction of the power source voltage greater than the first fraction, and wherein the recessive signal is located substantially near the power source voltage.

32. The light assembly of claim 30, wherein the recessive signal comprises a voltage between ground and a first fraction of a power source voltage, and the dominant signal comprises a voltage between ground and a second fraction of the power source voltage greater than the first fraction, and wherein the dominant signal is located substantially near the power source voltage.

33. The light assembly of claim 30, wherein the connection between the series of light fixtures consists of less than four wires providing power, ground and a control signal.

34. The light assembly of claim 30, wherein each of the fixtures within the series has a second operating mode different from the first operating mode.

35. The light assembly of claim 34, wherein the second operating mode is determined by a static condition of the operating status control signal to the fixtures.

36. The light assembly of claim 34, wherein the second operating mode comprises a failure mode in which the operating status control signal bypasses a failed light fixture.

37. The light assembly of claim 30, wherein in the second operating mode a fixture becomes a master, providing the operating status control signal for the other fixtures in the light assembly.

38. A light assembly, comprising:
a series of light fixtures in electrical communication with each other, each of the light fixtures having at least one microcontroller controlling operation of at least one lamp, wherein a control input to the fixtures utilizes a current source scheme providing tolerance to external loads that limits the input current to a fixed amount, increasing the dynamic range of the input for the external loads.

39. The light assembly of claim 38, wherein the control input comprises a DC input voltage which can vary between 9 and 32 volts without effecting the function of the light assembly.

40. The light assembly of claim 38, wherein an impedance of an external load between a control signal and either the power or ground can be as low as 1K ohms without substantially affecting the function of the light assembly.

41. The light assembly of claim 38, wherein the operation of the fixture when submerged with an impedance between a control signal and either the power or ground can be as low as 1K ohms without substantially affecting the function of the light assembly.

42. A light assembly, comprising:
a series of light fixtures in electrical communication with each other, each of the light fixtures having at least one microcontroller controlling operation of at least one lamp, wherein the at least one lamp include at least a first operating mode in which an operating status of the at least one lamp is controlled by a bit stream describing the next state of the fixtures.

43. The light assembly of claim 42, wherein the bit stream uses a low data rate, simple data pattern, and robust timing scheme to provide reliable performance.

44. The light assembly of claim 42, wherein the logic signal may include a start signal and a plurality of operating status signals corresponding to operating modes that may include "ON" and "OFF" operating modes for the illuminator array.

45. The light assembly of claim 42, wherein the signal duration is between 120-180 milliseconds without an intervening period.

46. The light assembly of claim 42, wherein the signal duration may be adjusted to coordinate with the number of fixtures within each group of fixtures in the series.

47. A method for using a light assembly, the method comprising:
providing a series of light fixtures in electrical communication with each other, each of the light fixtures having at least one microcontroller controlling operation of at least one or more lamp and a bypass circuit connected in serial with the microcontroller; and
placing the light assembly into at least one operating mode in which an operating status of the at least one lamp is controlled by an operating status control signal, and the bypass circuit enabled and disabled by the microcontroller allows some or all of the control signal to be blocked or passed to the next fixture.

48. The method of claim 47, wherein the light assembly functions as a marker or emergency light system.

49. The method of claim 47, wherein the light assembly functions to provide at least one of the following types of lighting systems: directional lighting; personnel safety lighting; roadside hazard lighting; security lighting; recreational lighting; landscape lighting; airport runway lighting; dock lighting; or marine lighting.

50. The method of claim 47, further comprising placing at least some of the fixtures within the series in a second operating mode different from the first operating mode.

51. The method of claim 50, wherein in the second operating mode a fixture becomes a master, providing the operating status control signal for the other fixtures in the light assembly.

52. The method of claim 50, wherein the second operating mode is determined by a static condition of the operating status control signal to the fixtures.

53. The method of claim 50, wherein the second operating mode comprises a failure mode in which the operating status control signal bypasses a failed light fixture.

* * * * *